United States Patent
Jang et al.

(10) Patent No.: US 12,041,675 B2
(45) Date of Patent: Jul. 16, 2024

(54) MULTI-LINK OPERATION MODE

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Suhwook Kim, Seoul (KR); Sungjin Park, Seoul (KR); Taewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/243,610

(22) Filed: Sep. 7, 2023

(65) Prior Publication Data

US 2023/0422328 A1   Dec. 28, 2023

Related U.S. Application Data

(63) Continuation of application No. 17/622,742, filed as application No. PCT/KR2020/008065 on Jun. 22, 2020.

(30) Foreign Application Priority Data

| Jul. 2, 2019 | (KR) | ......... 10-2019-0079644 |
| Sep. 3, 2019 | (KR) | ......... 10-2019-0109162 |
| Sep. 9, 2019 | (KR) | ......... 10-2019-0111763 |

(51) Int. Cl.
  H04W 76/15   (2018.01)
  H04W 84/12   (2009.01)

(52) U.S. Cl.
  CPC ......... *H04W 76/15* (2018.02); *H04W 84/12* (2013.01)

(58) Field of Classification Search
  CPC .................. H04W 76/15; H04W 84/12
  See application file for complete search history.

(56) References Cited

U.S. PATENT DOCUMENTS

2020/0413291 A1* 12/2020 Chu ............... H04W 76/15

* cited by examiner

*Primary Examiner* — Will W Lin
(74) *Attorney, Agent, or Firm* — BRYAN CAVE LEIGHTON PAISNER LLP

(57) ABSTRACT

In a wireless local area network (WLAN) system, a station (STA) may support a multi-link. The STA may generate a PDDU including operation mode information on whether transmission of a signal and reception of a signal can be performed simultaneously. The STA may transmit the PPDU.

18 Claims, 31 Drawing Sheets

(a)

(b)

PPDU Format (IEEE 802.11a/g)

HT PPDU Format (IEEE 802.11n)

VHT PPDU Format (IEEE 802.11ac)

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

MULTI-LINK OPERATION MODE

This application is a continuation of U.S. patent application Ser. No. 17/622,742 filed on Dec. 24, 2021, which is a is the National Stage filing under 35 U.S.C. 371 of International Application No. PCT/KR2020/008065 filed on Jun. 22, 2020, which claims priority to Korean Patent Application No. 10-2019-0079644 filed on Jul. 2, 2019; Korean Patent Application No. 10-2019-0109162 filed on Sep. 3, 2019 and Korean Patent Application No. 10-2019-0111763 filed on Sep. 9, 2019, the contents of which are all hereby incorporated by reference herein in their entirety.

TECHNICAL FIELD

The present specification relates to a method for transmitting information related to an operation mode for multi-link in a wireless local area network (WLAN) system.

RELATED ART

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

A method performed by a station (STA) in a wireless local area network (WLAN) system according to various embodiments may include technical features related to a method for setting an operation mode using multi-link. A station (STA) may support multi-link. The STA may generate a PPDU including operation mode information related to whether signal transmission and signal reception can be simultaneously performed. The STA may transmit the PPDU.

According to an example of the present specification, the STA may operate in a simultaneous transmit and receive (STR) mode or a non-STR mode. The STA may provide supportable mode capability information to the AP, and the AP may set an operation mode of the STA. The operation mode of the STA may be dynamically changed. The STA may support multi-links, and in some cases, there may be a link that must operate as an STR and a link that must operate as a non-STR. Therefore, according to an example of the present specification, there is the effect that an optimal operation mode can be set in each case.

BRIEF DESCRIPTION OF THE DRAWINGS

FIG. 18 illustrates an example of a PPDU used in the present specification.

DESCRIPTION OF EXEMPLARY EMBODIMENTS

Figure 1:
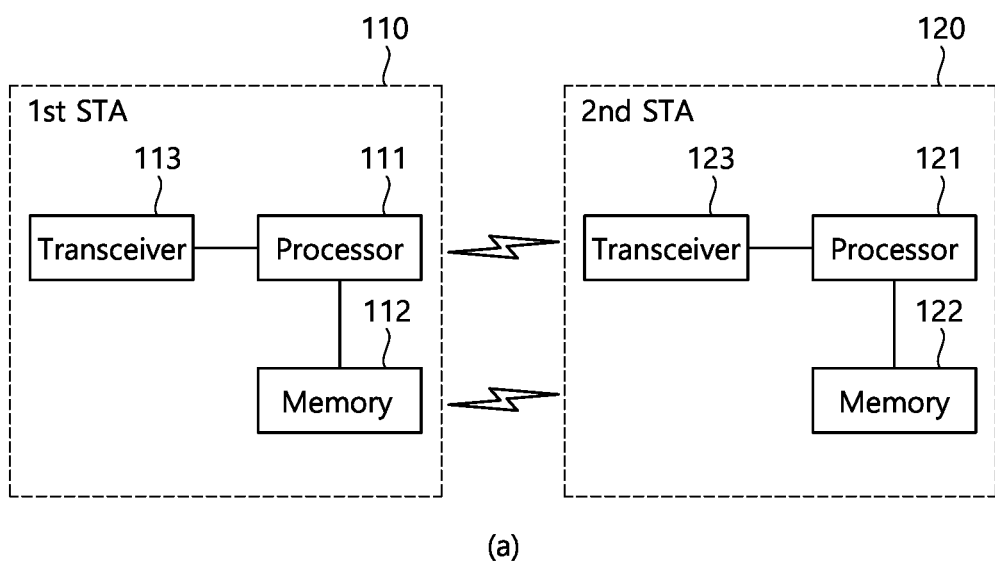
FIG. 1 shows an example of a transmitting apparatus and/or receiving apparatus of the present specification.
Figure 1:
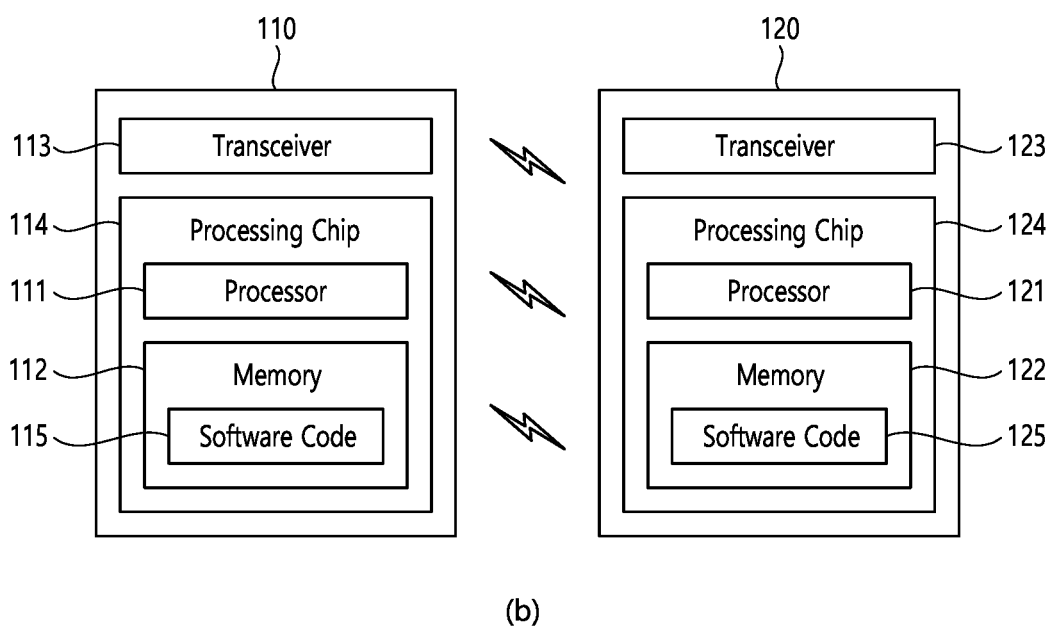

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AN, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
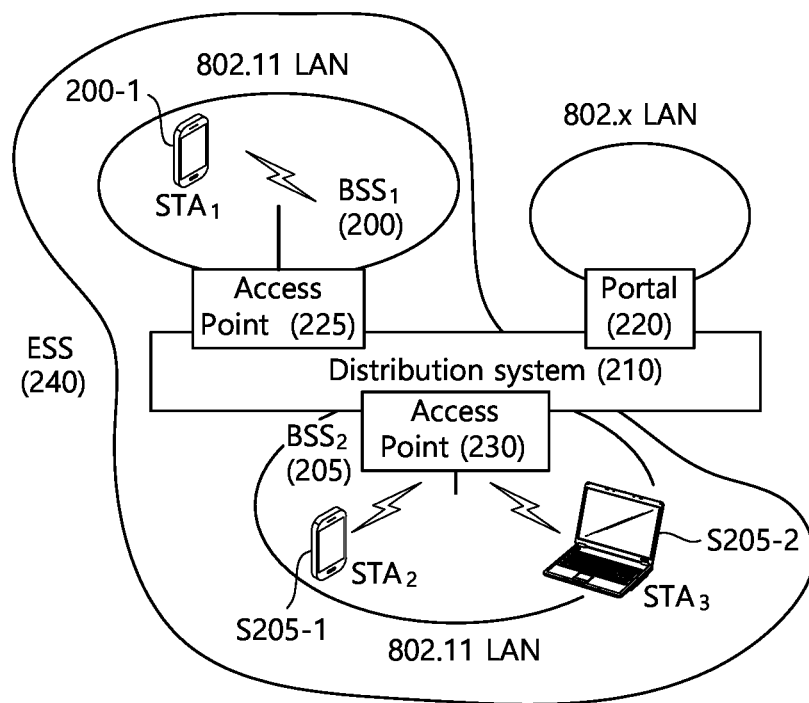
FIG. 2 is a conceptual view illustrating the structure of a wireless local area network (WLAN).
Figure 2:
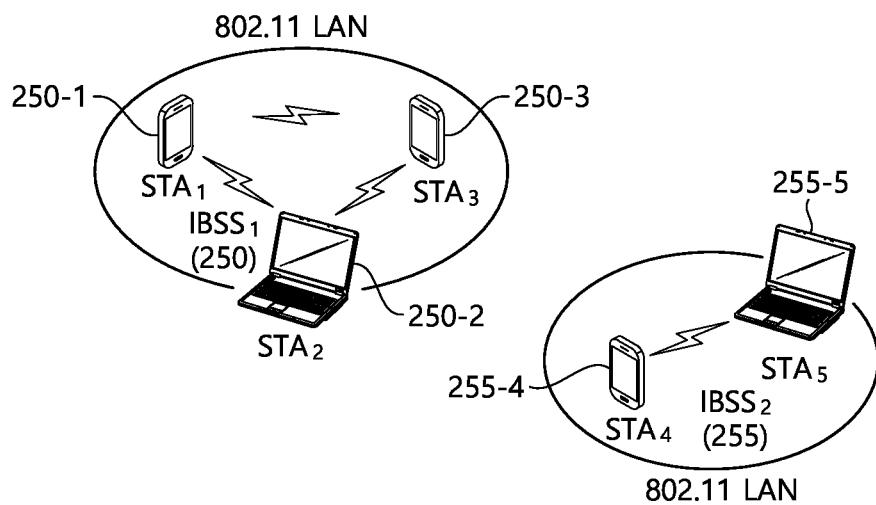

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
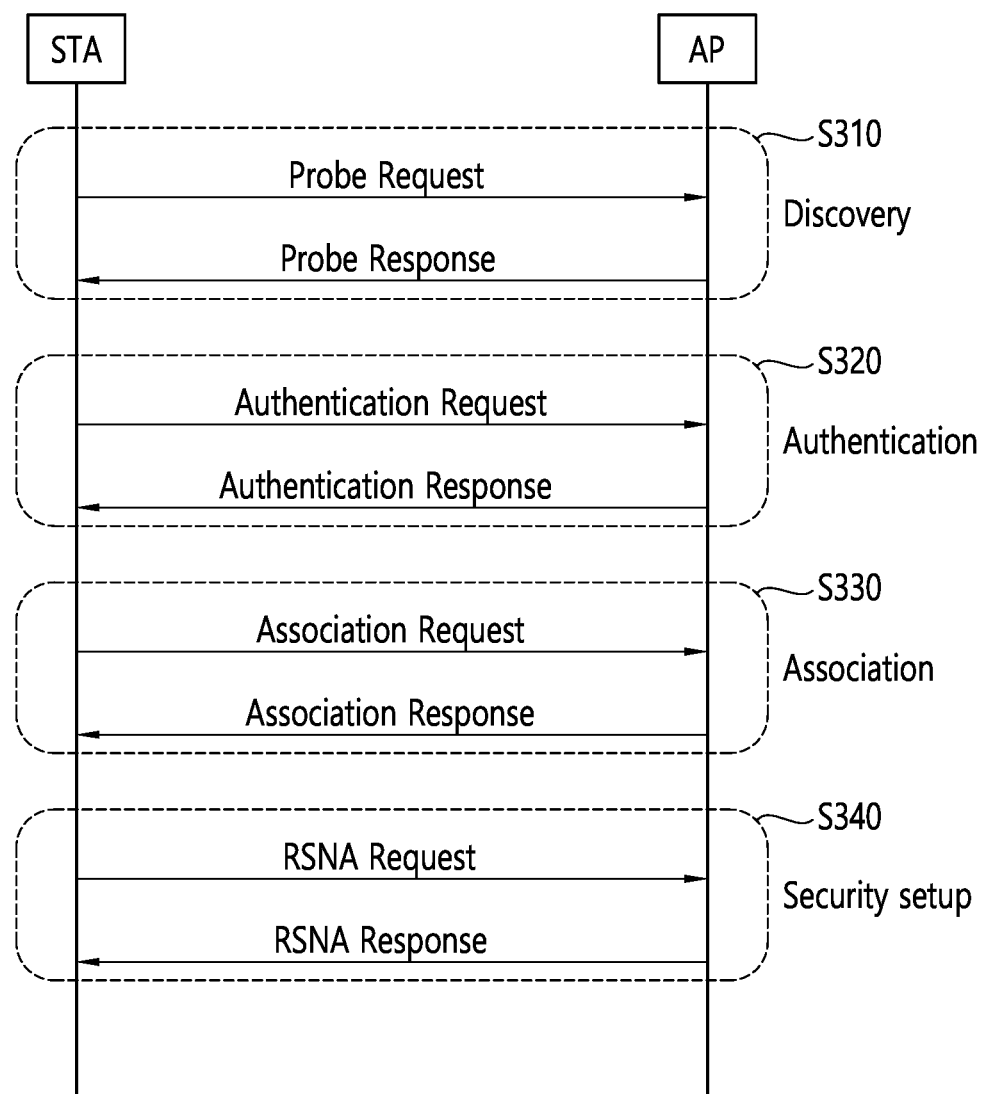
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
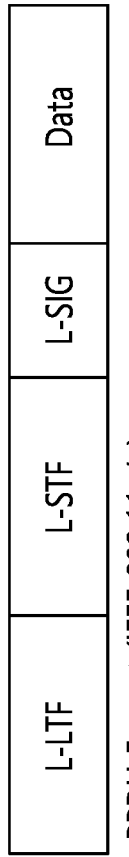
FIG. 4 illustrates an example of a PPDU used in an IEEE standard.
Figure 4:
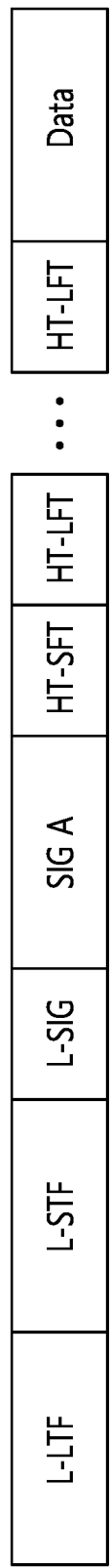
Figure 4:
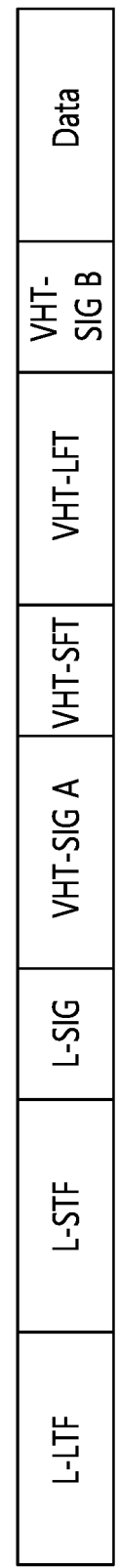
Figure 4:
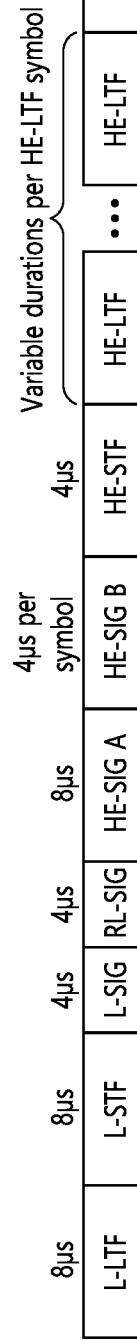

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
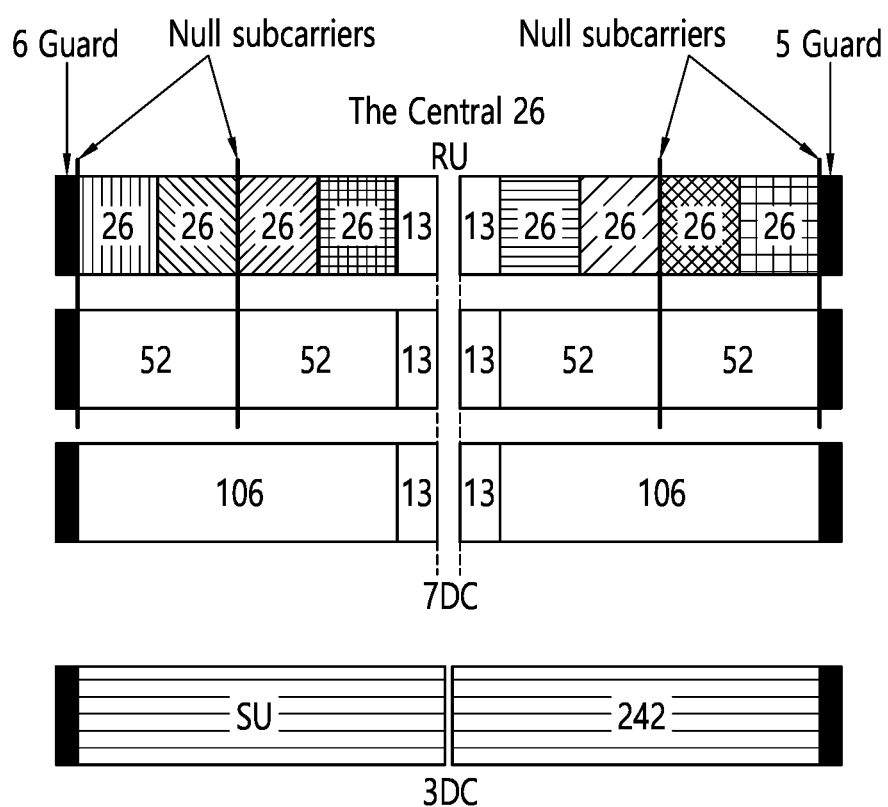
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
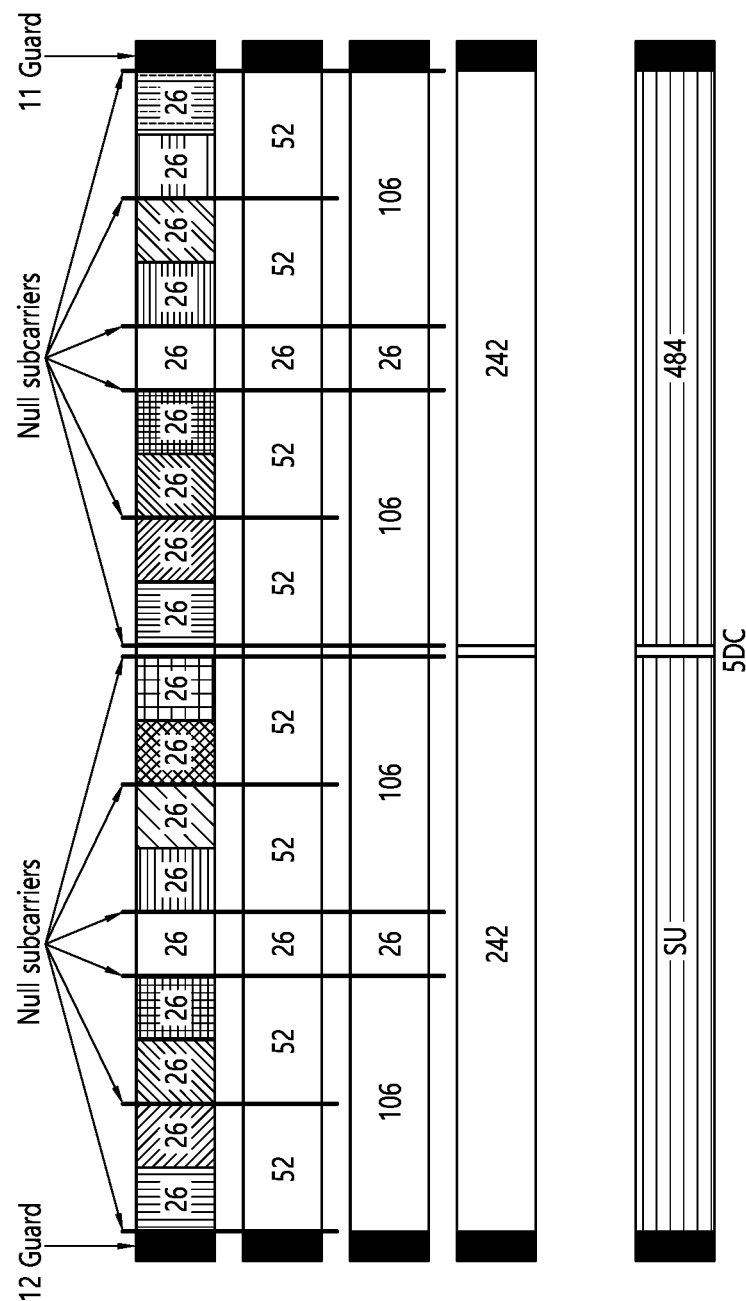
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
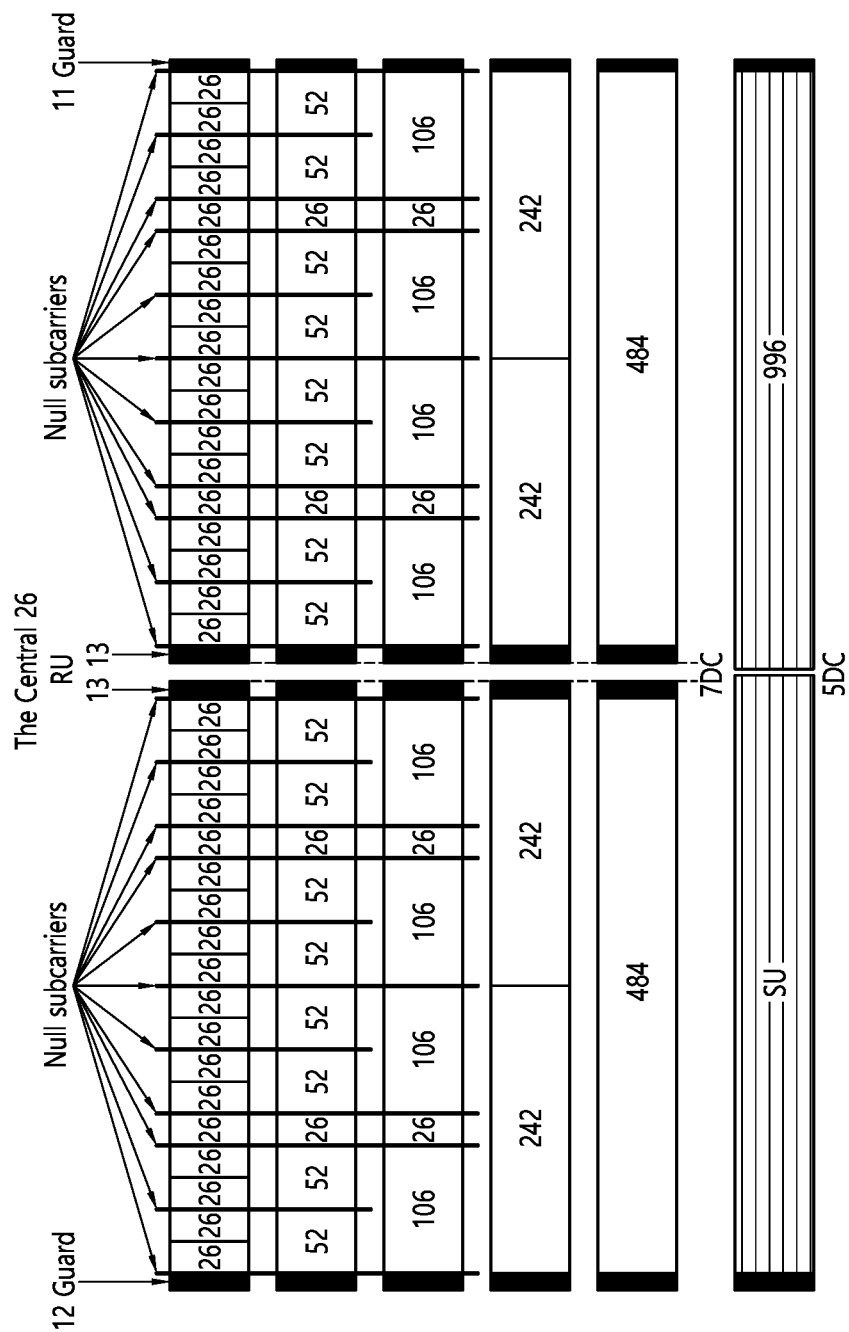
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
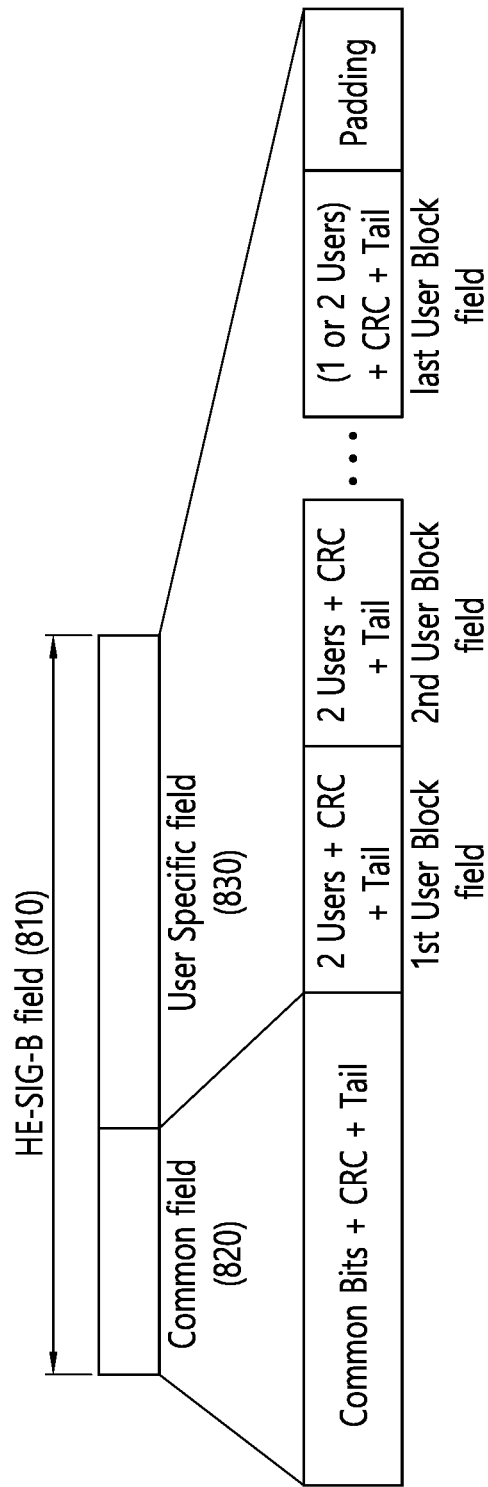
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
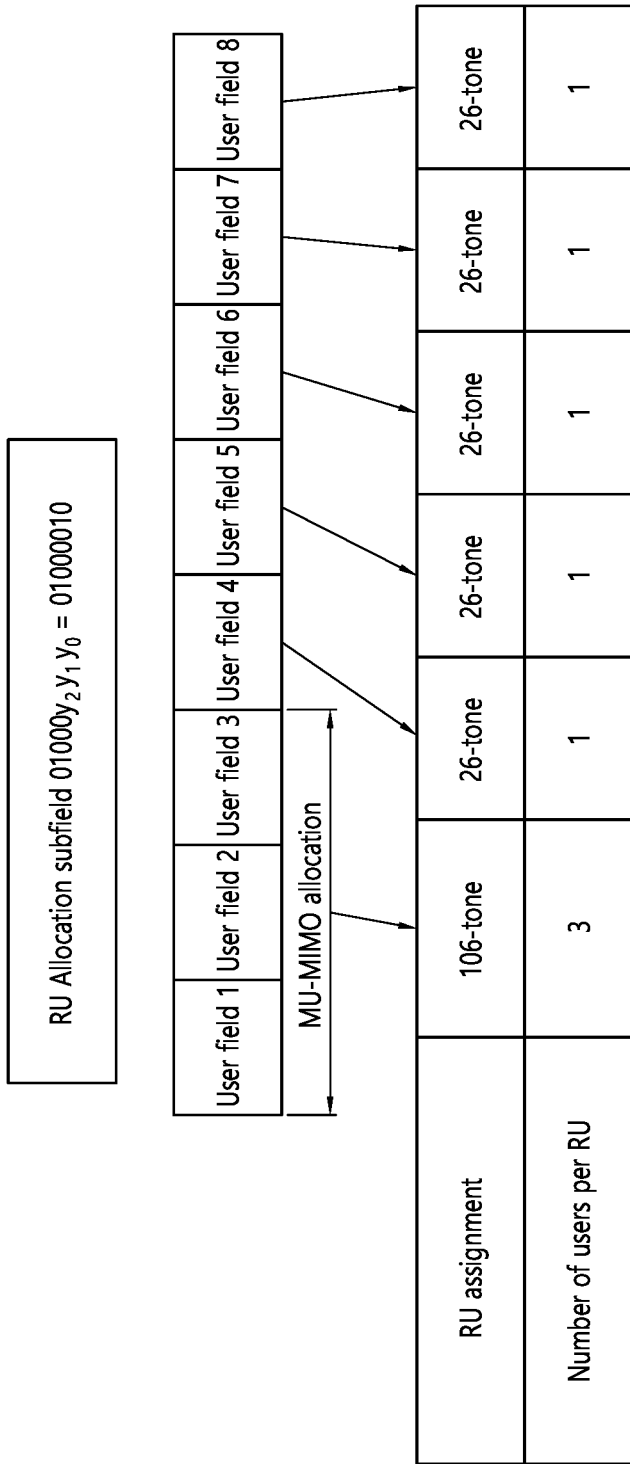
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
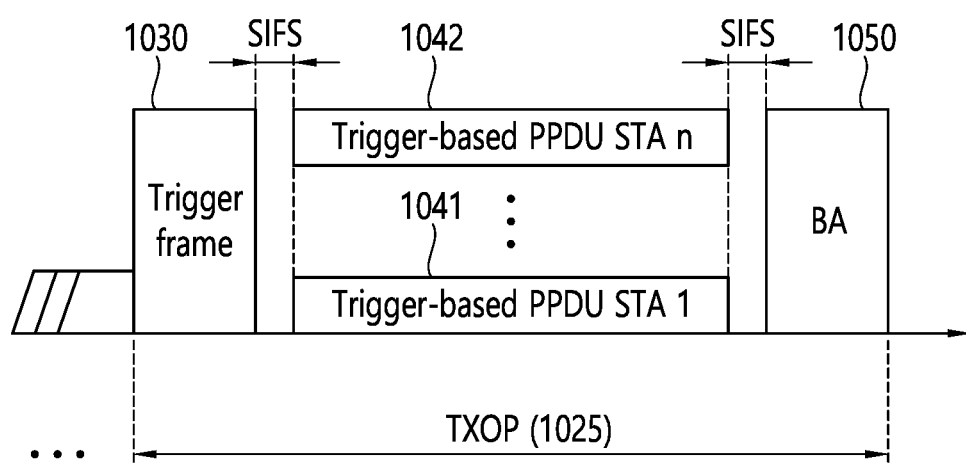
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
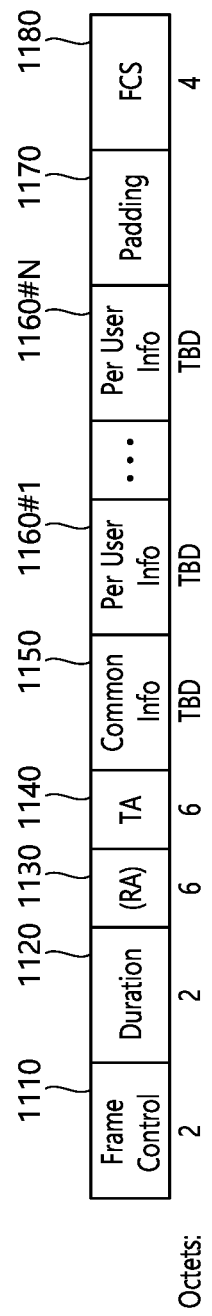
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
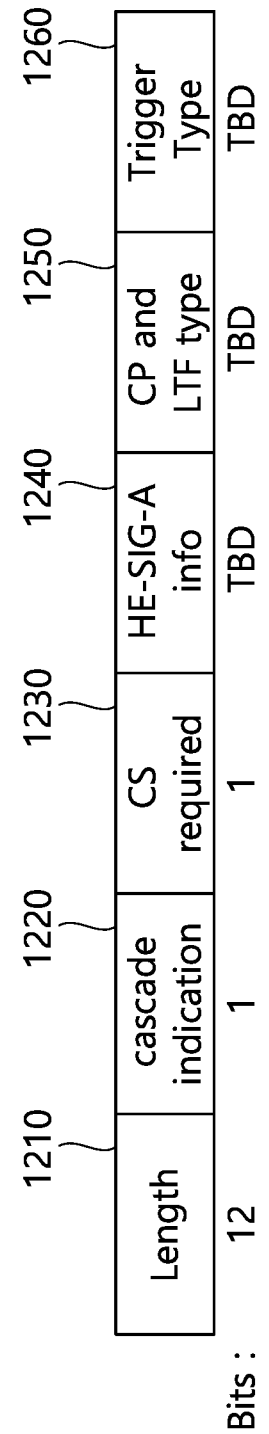
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
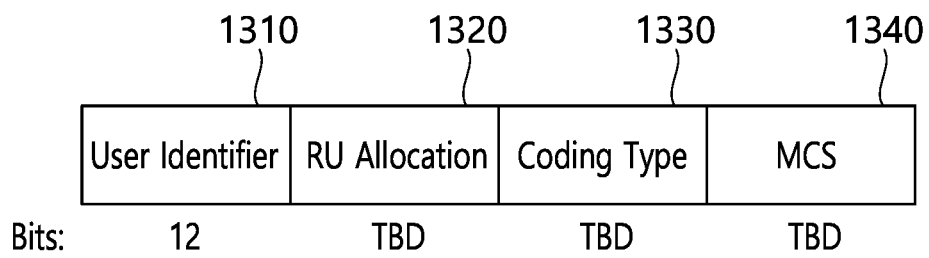
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
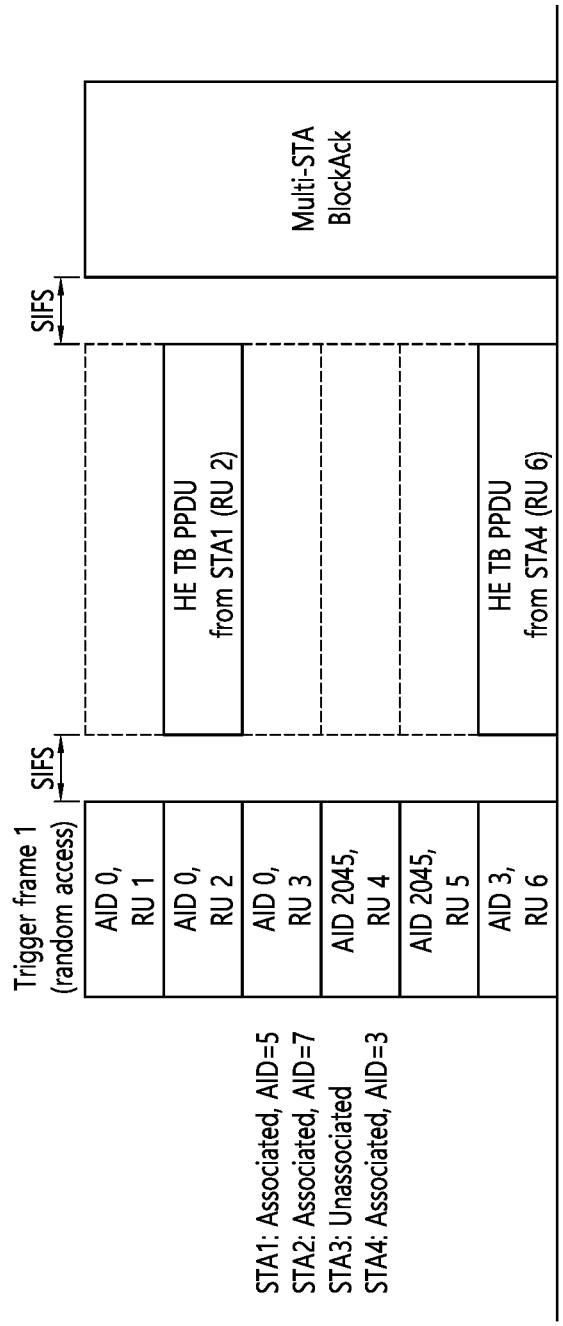
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
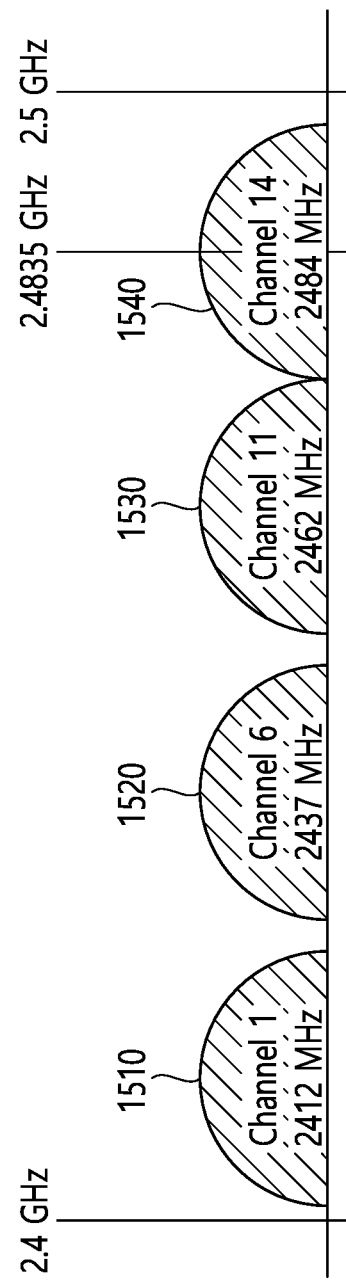
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
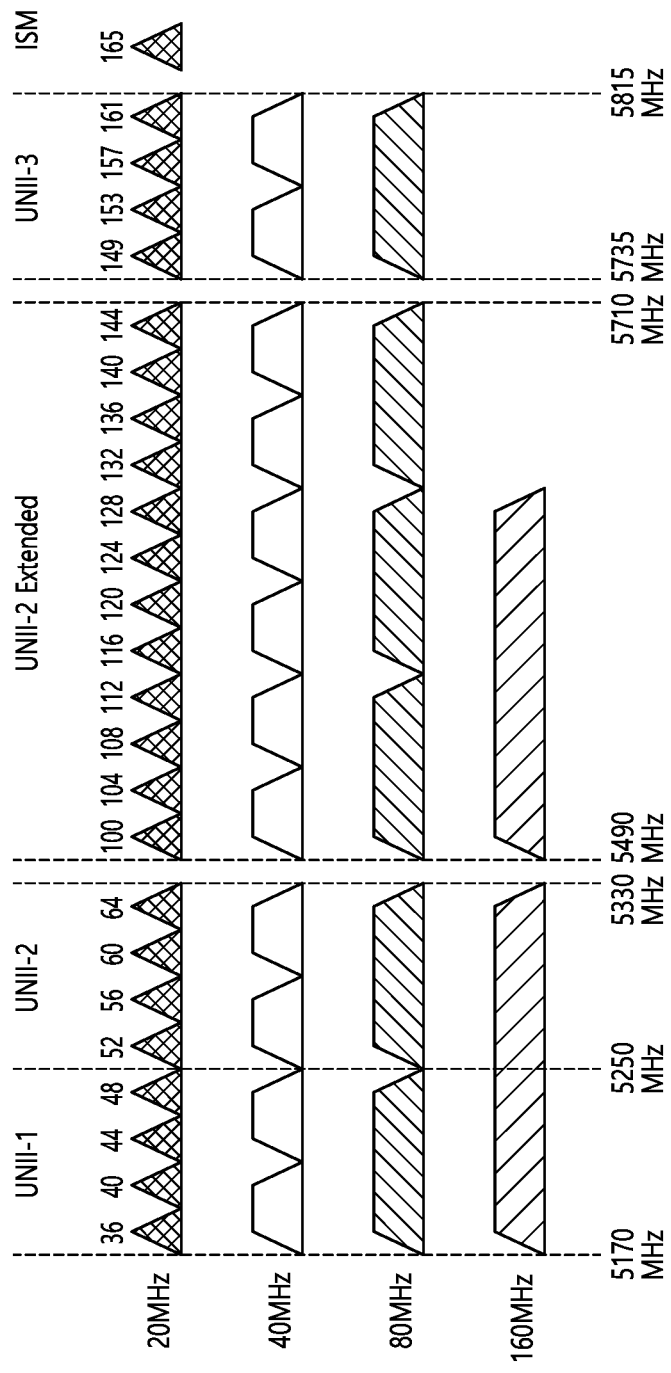
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
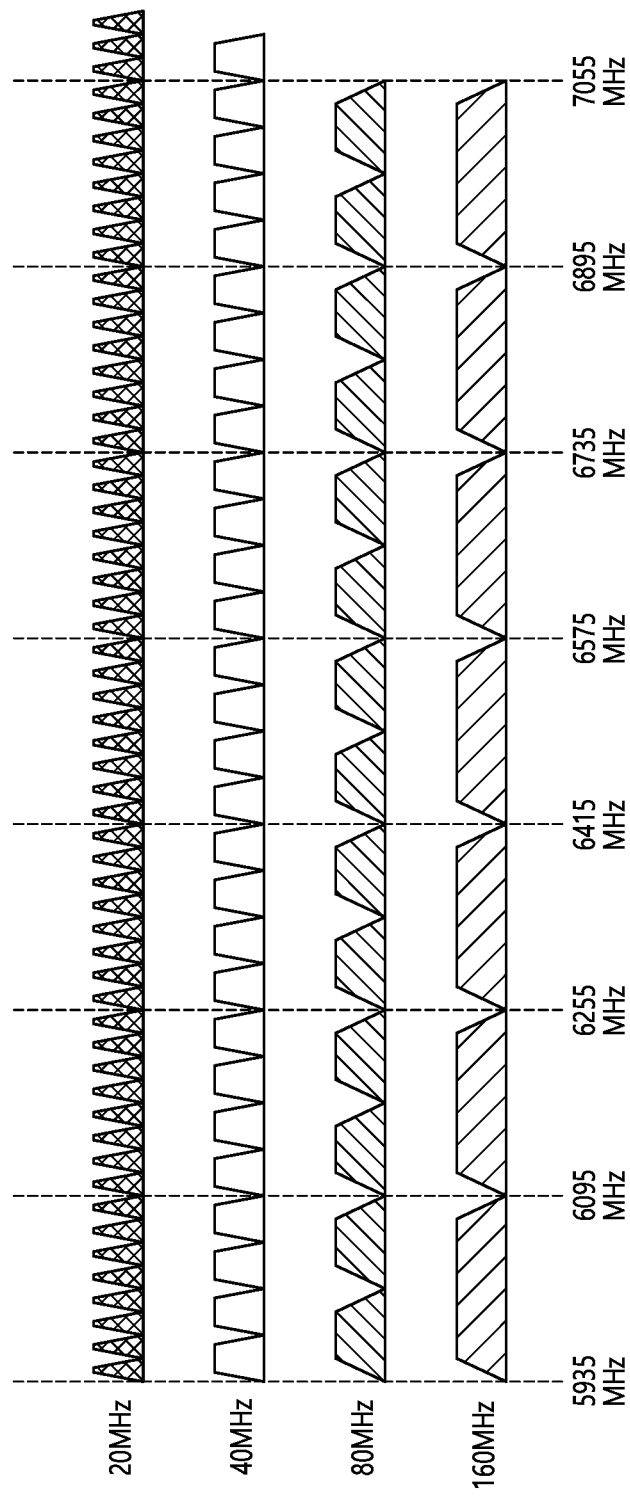
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+ 0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based (TB) PPDU on the EHT system may be separately defined or configured based on the example of FIG. 18. The trigger frame described through at least one of FIGS. 10 to 14 and the UL-MU operation initiated by the trigger frame (for example, the transmission operation of the TB PPDU) may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index+28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical features of the HE-SIG-B shown in the examples of FIGS. 8 to 9. The EHT-SIG may be referred to by various names such as a second SIG field, a second SIG, a second type SIG, a control signal, a control signal field, and a second (type) control signal.

The EHT-SIG may include N-bit information (for example, 1-bit information) regarding whether the EHT-PPDU supports the SU mode or the MU mode.

The EHT-SIG may be configured based on various MCS scheme. As described above, information related to the MCS scheme applied to the EHT-SIG may be included in the U-SIG. The EHT-SIG may be configured based on the DCM scheme. For example, among the N data tones (for example, 52 data tones) allocated for the EHT-SIG, a first modulation scheme may be applied to a continuous half tone, and a second modulation scheme may be applied to the remaining consecutive half tones. That is, the transmitting STA may modulate specific control information to the first symbol based on the first modulation scheme and allocate it to consecutive half tones, and may modulate the same control information to the second symbol based on the second modulation scheme and allocate it to the remaining consecutive half tones. As described above, information (for example, 1-bit field) related to whether the DCM scheme is applied to the EHT-SIG may be included in the U-SIG. The EHT-STF of FIG. 18 may be used to improve automatic gain control estimation in a multiple input multiple output (MIMO) environment or an OFDMA environment. The EHT-LTF of FIG. 18 may be used to estimate a channel in a MIMO environment or an OFDMA environment. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1× STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\}$$  <Equation 1>

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2)$$

$$\text{EHT-STF}(0)=0$$  <Equation 2>

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2)$$  <Equation 3>

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}*(1+j)/\text{sqrt}(2)$$  <Equation 4>

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}*(1+j)/\text{sqrt}(2)$$  <Equation 5>

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}*(1+j)/\text{sqrt}(2)$$  <Equation 6>

Equation 7 to Equation 11 below relate to an example of a second type (i.e., 2×STF) sequence.

$$\text{EHT-STF}(-120{:}8{:}120)=\{M,0,-M\}*(1+j)/\text{sqrt}(2)$$  <Equation 7>

The EHT-STF for the 40 MHz PPDU may be configured based on the following equation.

$$\text{EHT-STF}(-248{:}8{:}248)=\{M,-1,-M,0,M,-1,M\}*(1+j)/\text{sqrt}(2)$$

$$\text{EHT-STF}(-248)=0$$

$$\text{EHT-STF}(248)=0$$  <Equation 8>

The EHT-STF for the 80 MHz PPDU may be configured based on the following equation.

$$\text{EHT-STF}(-504{:}8{:}504)=\{M,-1,M,-1,-M,-1,M,0,-M,1,M,1,-M,1,-M\}*(1+j)/\text{sqrt}(2)$$  <Equation 9>

The EHT-STF for the 160 MHz PPDU may be configured based on the following equation.

$$\text{EHT-STF}(-1016{:}16{:}1016)=\{M,-1,M,-1,-M,-1,M,0,-M,1,M,1,-M,-M,1,-M,1,M,1,-M,0,-M,1,M,1,-M,1,-M\}*(1+j)/\text{sqrt}(2)$$

$$\text{EHT-STF}(-8)=0, \text{EHT-STF}(8)=0,$$

$$\text{EHT-STF}(-1016)=0, \text{EHT-STF}(1016)=0$$  <Equation 10>

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504{:}8{:}504)=\{-M,1,-M,1,M,1,-M,0,-M,1,M,1,-M,1,-M\}*(1+j)/\text{sqrt}(2)$$

$$\text{EHT-STF}(-504)=0,$$

$$\text{EHT-STF}(504)=0$$  <Equation 11>

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
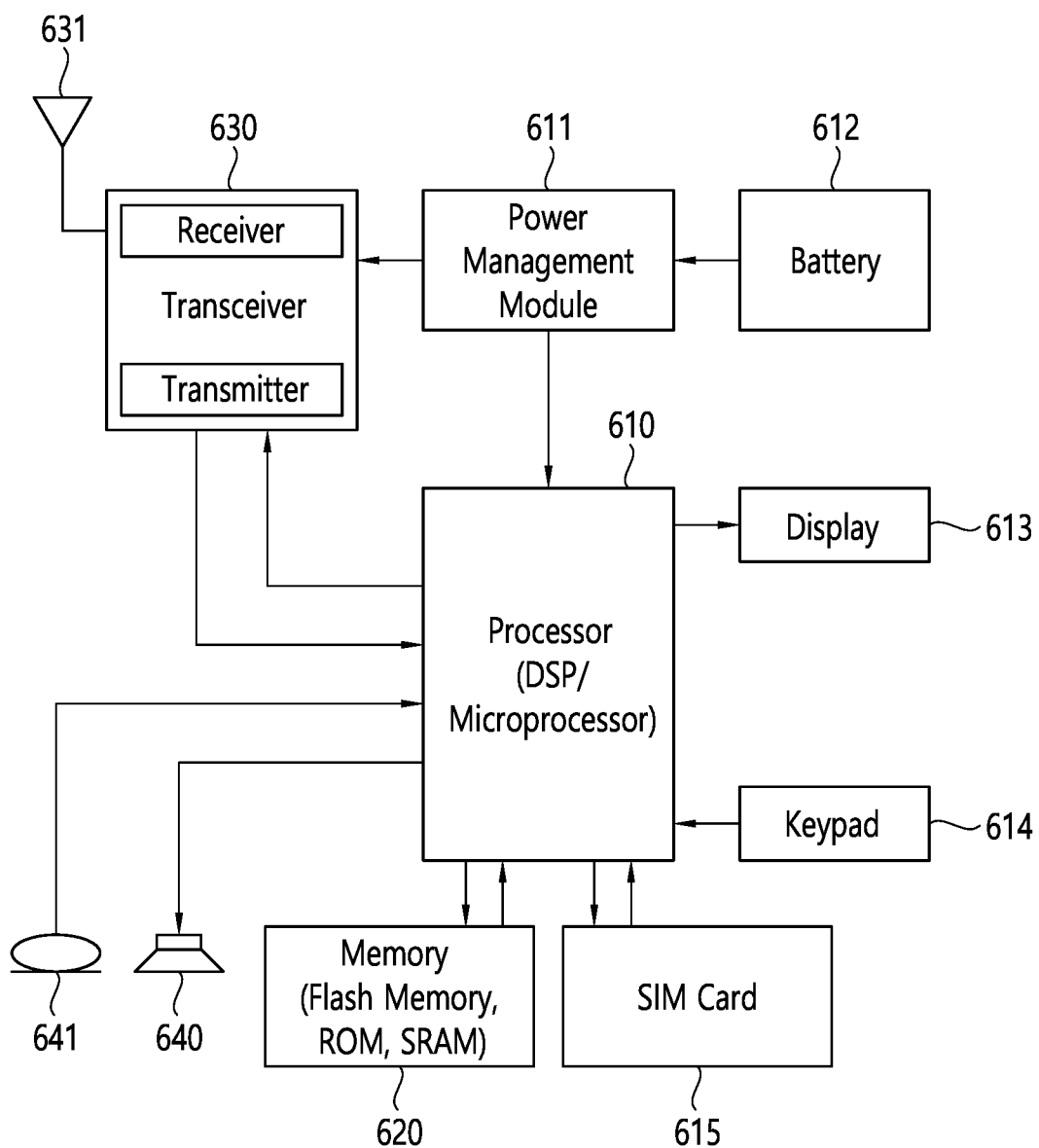
FIG. 19 illustrates an example of a modified transmitting device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

The STA described below may be an apparatus of FIG. 1 and/or FIG. 19, and the PPDU described below may be the PPDU of FIG. 18. The STA may be an AP or a non-AP STA. The STA (for example, AP or non-AP STA) described below may be a multi-link STA (for example, an AP multi-link device (MLD) or a non-AP STA MLD).

EHT (IEEE802.11be) considers multi-link aggregation/operation as one of the main technologies. Here, the multi-link may include a multi-band. That is, the multi-link may represent a link of several bands. For example, in a multi-link, each link may be a link of a different frequency band or may be different links within the same frequency band.

Figure 20:
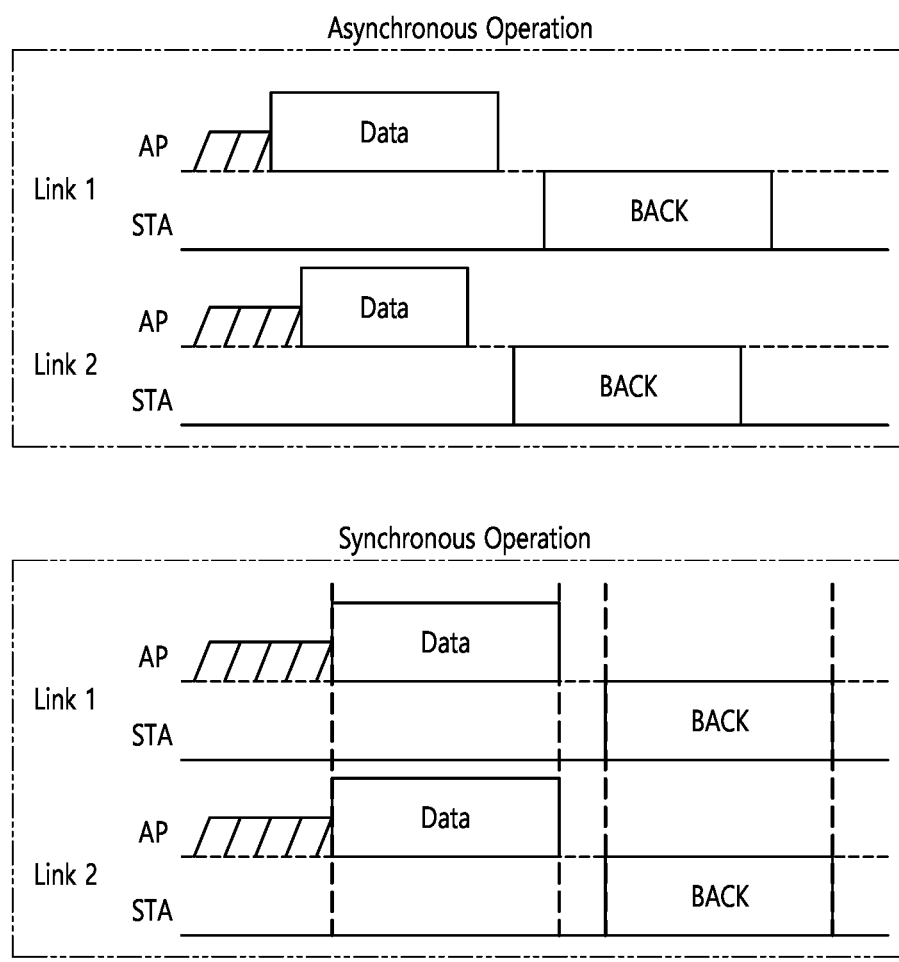
FIG. 20 is a diagram illustrating a multi-link operation mode.

FIG. 20 is a diagram illustrating a multi-link operation mode.

Referring to FIG. 20, the multi-link operation may be divided into two modes, 1) Asynchronous (Async.) Operation and 2) Synchronous (Sync.) Operation.

The asynchronous operation mode refers to a case in which signals are transmitted and received independently for each link, and the synchronous operation mode refers to a case in which signal transmission/reception timings are matched for each link. For example, in the case of the synchronous operation mode, the start time and/or end time of the transmission signal may be aligned.

For example, the asynchronous operation mode may be referred to as a simultaneous transmit and receive (STR) mode. For example, when the STA transmits and receives a signal without synchronizing between links, a case may occur in which a signal is transmitted in the second link while receiving a signal in the first link. That is, the asynchronous operation mode can be performed only by STAs capable of simultaneous transmission and reception operations. For example, STAs capable of simultaneous transmission and reception operations may be referred to as an STR AP MLD or an STR non-AP MLD.

For example, the synchronous operation mode may be referred to as a non-STR mode. Since simultaneous transmission and reception is not required in the synchronous operation mode, STAs that cannot perform simultaneous transmission and reception operations may operate in the non-STR mode.

Even STAs capable of simultaneous transmission and reception (for example, an STR AP MLD or an STR non-AP MLD) may operate in the non-STR mode. That is, a STA capable of simultaneous transmission/reception operation could operate in the STR mode or the non-STR mode.

For example, a STA that cannot perform simultaneous transmit/receive operation can operate only in the non-STR mode and cannot operate in the STR mode.

In the asynchronous operation mode (that is, an STR mode) as shown in FIG. 20, frames can be independently transmitted between links. In the synchronous operation mode (that is, non-STR mode), frames may be transmitted in synchronization with inter-link frames (that is, transmission start points and/or end points of PPDUs may be aligned). An STA supporting IEEE802.11be may transmit a frame using multiple RFs, that is, multiple links. Among the multiple links, there may be links that must operate in an asynchronous mode or a synchronous operation mode, and in many cases, it may be necessary to switch modes. Hereinafter, a method for transmitting information related to a multi-link operation mode for supporting it will be described.

The STA described below may transmit operation mode information related to whether it can operate as a simultaneous transmit and receive (STR). That is, the STA may generate and transmit a PPDU including operation mode information related to whether signal transmission and signal reception can be simultaneously performed. For example, the STA may transmit information related to whether it can operate as an STR or whether it can operate as a non-STR. When the STA operates as an STR, each link may perform transmission/reception independently, and when operating as a non-STR, each link may perform transmission/reception in synchronization with each other. For example, each link may operate in different multi-link operation modes (STR, non-STR).

The AP described below may receive, from the STA, information related to whether the STA can operate as an STR or a non-STR, and may determine in which mode the STA will operate based on the received information. The multi-link operation mode (for example, an STR mode or a non-STR mode) may be set differently for each link. The multi-link operation mode can be dynamically changed.

Hereinafter, a method for setting a multi-link operation mode will be described.

A method of transmitting information related to a multi-link operation mode may be divided into three cases as follows, and each case may be performed in conjunction or may be performed separately.

A. Link Setup: A multi-link operation mode for each link can be set in the step of providing link information or the step of negotiation of capability.

B. Control frame: A multi-link operation mode can be switched using a control frame.

C. Control field: A multi-link operation mode may be switched using a control field.

1. Link Setup

A multi-link operation mode for each link may be determined in a link setup step. Information related to the multi-link operation mode may be transmitted/received in the link setup step. For example, the information related to the multi-link operation mode may be included in an EHT Capability/Operation element or a new multi-link related element. For example, an element including information related to a multi-link operation mode may be included in a Beacon, Probe Request/Response, (Re)Association Request/Response, etc.

Information that could be included in a signal (for example, Beacon, Probe Request/Response, (Re)Association Request/Response, etc.) including information related to the multi-link operation mode is as follows, but is not limited thereto.

The AP and the STA may basically have the following multi-link (ML) capability information.

Number of Supported Links (NSL): The total number of links that the STA can support for multi-link operation (for example, the number of RF/antennas).

Link identifier (or Link information): An identifier that can distinguish each link. For example, the STA may newly define an identifier for each link. For example, the STA may define a link identifier using an existing BSSID, BSS Color, etc. For example, the STA may define the identifier based on channel information for the link.

Ex 1) New Link ID: 0, 1, etc.

Ex 2) Channel information: A method of defining a link identifier based on channel information may use channel indication information used in HT/VHT/HE Operation element, or may be newly defined in the EHT so that link channel information may be expressed as a primary channel number, a center frequency, a channel width, etc.

Supported Band Information (SBI): There may be information on a band capable of multi-link operation, specifically an ID that can distinguish a band in which EHT operates, a Band ID field of the existing spec, etc., however, is not limited to this.

Ex 1) Band ID: 0-2.4 GHz, 1-5 GHz, 2-6 GHz, etc.

Ex 2) Band ID field: 2-2.4 GHz, 4-5 GHz, 7-6 GHz, etc.

Number of Supported Links per Band (NSLpB): The number of links that can support multi-link per band Ex 1) 1, 2, 3, etc.

Supported Bandwidth (SB) (per band): Bandwidth that can be supported. This bandwidth information may be indicated as a supportable bandwidth for each frequency band.

Ex 1) In case of indication regardless of the frequency band (for example, the maximum bandwidth supported in all bands): 80/160/320 MHz, etc.

Ex 2) In case of indication by frequency band: 160 MHz in 5 GHz band, 160 MHz in 6 GHz band, etc.

Supported number of Spatial Stream (NSS): Number of Spatial Streams supported by each link Ex) 1/2/4/8/16

Link Status: Information on whether each link is currently available for data transmission (On/Off). Link Status may include not only information related to the capability that can be used for data transmission, but also information related to whether or not to use the link for data transmission even if the link has the capability for data transmission.

Ex) In the case of indicating by link-specific information, for example, it can be indicated as follows.

0: The STA cannot use the link for current data transmission.

1: The STA can use the link for current data transmission.

Ex) When not indicated by information for each link, it can be expressed in the form of a bitmap. For example, in the case of 011, the first link may include information that there is the capability for data transmission, but is not currently used for data transmission.

Preferred links or bands: A frequency band or link preferred by the STA may be indicated. The preferred link may be determined based on the BSS information of the AP or may be determined by the STA itself.

Ex) 1: Prefer the Link or Band

In some cases, all of the above contents may be included, or only some of the above contents may be included. For example, if each link is classified only by a band, a link identifier may not be needed. For example, if the order/location indicating the band information is determined, the Supported band information field may not be included. For example, since a single Supported link may support multiple bands instead of one band, the sum of the Number of Supported Links per band for all bands may not equal the Number of Supported Links. In this case, both Number of Supported Links per band and Number of Supported Link may exist. For example, if implementing/defining that one link can support only one band in order to reduce complexity, the total number of Number of Supported Links and Number of Supported Links per band will be the same, in this case, the Number of Supported links field may not be included. For example, in the case of Link Status, if the AP/STA includes only information related to a link capable of data transmission in the capability information, Link Status information may not be included. For example, preferred links or bands may be included in elements other than capabilities. (Preferred links or bands may not be included if no preference is required).

Information on the operation mode is as follows.

Multi-link Operation Mode (MOM): Information related to a synchronous operation mode (that is, non-STR) or an asynchronous operation mode (that is, STR). For example, information related to whether the STA operates as a non-STR or an STR may be included.

Ex) If MOM=1, it operates in synchronous operation mode (that is, non-STR), otherwise it operates in asynchronous operation mode (that is, STR).

The meaning that the STA supports the asynchronous operation mode (that is, STR) may be interpreted as being able to sufficiently support the synchronous operation mode (that is, non-STR). That is, the asynchronous operation mode (that is, STR) may include a synchronous operation mode (that is, non-STR).

The above information may have several options depending on the presence or absence of a default operation in the multi-link. For example, if the asynchronous operation mode (that is, STR) is a mandatory or baseline multi-link operation, information about the synchronous operation mode (that is, non-STR) may be included.

Dynamic Operation Mode (DOM): Information related to whether a link operating in an asynchronous operation mode (that is, STR) can be dynamically switched to a synchronous operation mode (that is, non-STR).

For example, the DOM may be information independent to the MOM.

Ex) If DOM=1, dynamic mode switching is possible, such as STR->non-STR->STR.

For example, the information related to the operation mode may be capability information of the STA. For example, the information related to the operation mode may be information related to the operation mode in which the STA will operate. For example, the STA may transmit information related to an operation mode supported by the STA, and the AP may transmit information related to an operation mode in which the STA will actually operate.

Figure 21:
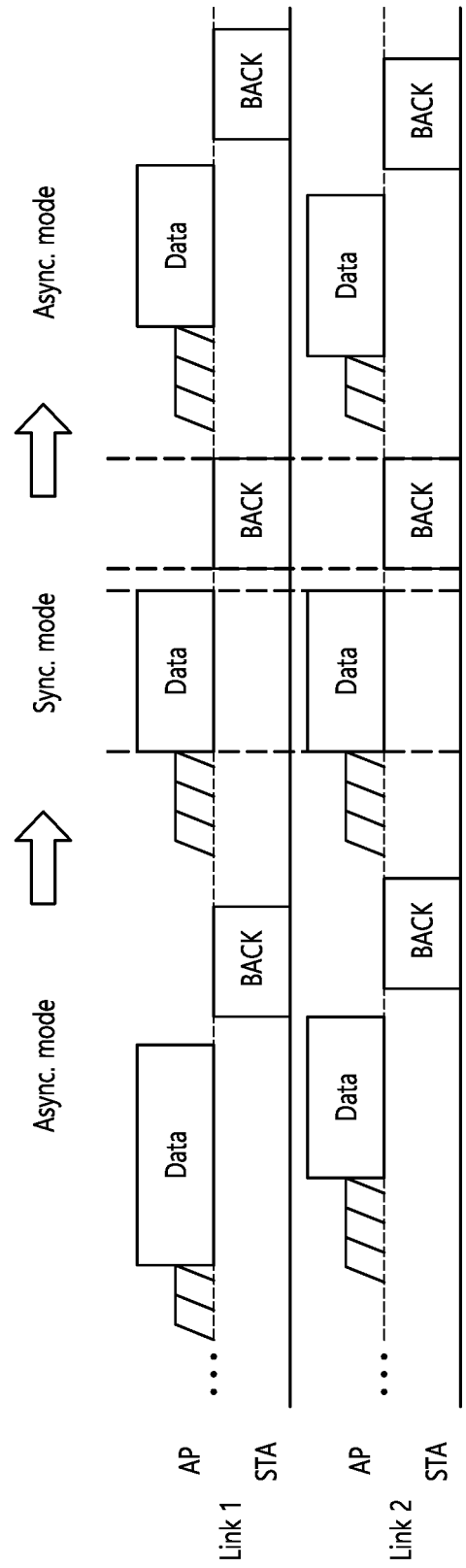
FIG. 21 is a diagram illustrating an embodiment of a method of dynamically switching a multi-link operation mode.

FIG. 21 is a diagram illustrating an embodiment of a method of dynamically switching a multi-link operation mode.

Referring to FIG. 21, since the DOM can be indicated independently of the MOM, it will be described below based on only the MOM.

1) Option 1: When Default Operation is Determined. For Example, when the Default Operation is Determined to be STR (or Asynchronous Operation Mode) or Non-STR (or Synchronous Operation Mode)

A link for an operation other than the default operation may be indicated through the link information. For example, when the basic operation is STR, the STA may transmit information related to a link operating in a non-STR.

Ex) Sync Operation Link: 1, 2 (Default: Async)

MOM and link information may exist as a tuple, but it is not necessarily indicated because the MOM may be indicated implicitly.

For example, if the default operation is STR (or asynchronous operation mode) and there are several link pairs operating as non-STR (or synchronous operation mode), that is, if there are several pairs of links that need to be transmitted in synchronization, additional information (for example, Sync Operation number) to distinguish them may be required.

Ex) Sync Operation number=0+Link ID=1, 2: Links 1 and 2 operate as STR

Ex) Sync Operation number=1+Link ID=4, 5: Links 4 and 5 operate as non-STR

Figure 22:
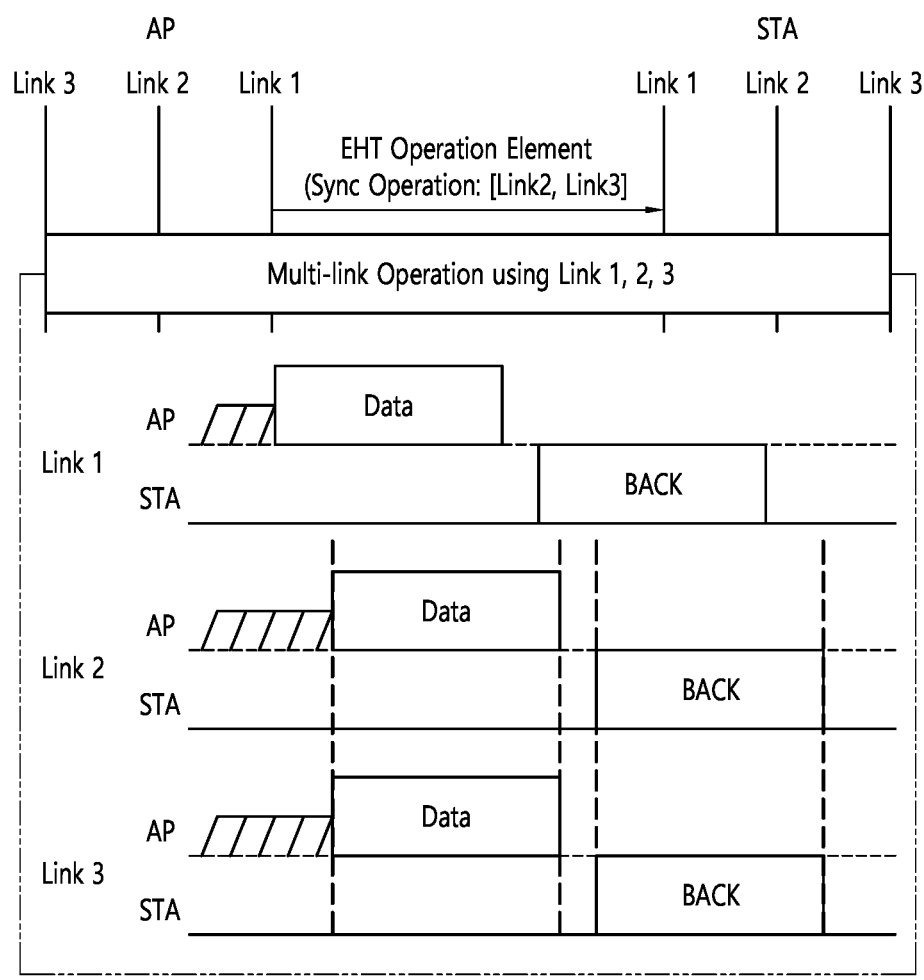
FIG. 22 is a diagram illustrating an embodiment of a method for switching a multi-link operation mode in option 1 in which the default behavior is determined.

FIG. 22 is a diagram illustrating an embodiment of a method for switching a multi-link operation mode in option 1 in which the default behavior is determined.

Referring to FIG. 22, the multi-link operation mode may be switched using the Link information described in FIG. 21 and the EHT Operation Element.

In the BSS in FIG. 22, STR (or Async. Operation) may be a Default Operation. Accordingly, the AP may inform the STA of link information for transmitting a frame in a non-STR (that is, Sync. Operation mode) through the EHT Operation Element. Therefore, non-STR (that is, Sync. Operation) is applied to links 2 and 3, and in the communication between the AP and the STA, link 2 and link 3 synchronize and transmit a frame. That is, link 2 and link 3 may operate in a non-STR mode in which simultaneous transmission and reception are not performed.

2) Option 2: When Default Operation is not Determined

The instruction method of option 2 can also be utilized in option 1.

A method for indicating for all links, that is, setting the mode (that is, STR or non-STR) for all links.

Ex) When MOM=1, all links operate as non-STR (that is, Sync), otherwise operate as STR (that is, Async).

A method for indicating in the form of a tuple of MOM and Link information.

Ex) [MOM=1, Link ID=1]

For example, when one MOM is applied to several links, one or more link information may be combined in one MOM.

Ex) [MOM=0, Link ID=1,2]

If there is a link order, information related to the multi-link operation mode for each link may be transmitted in the form of a MOM bitmap without link information.

Ex) [MOM bitmap: 0011]: 1st link and 2nd link operate as STR (that is, Async), 3rd link and 4th link operate as non-STR (that is, Sync).

When it is indicated for a link by frequency band

Ex 1) When the band order is fixed (2.4 GHz-5 GHz-6 GHz), [MOM=010]: A method for operating as non-STR (that is, Sync) within 5 GHz, and operating as STR (that is, Async) within 2.4 GHz and 6 GHz.

Ex 2) In case the band order is not determined [5 GHz+MOM=1, 6 GHz+MOM=0]: A method for operating as non-STR (that is, Sync) within 5 GHz, and operating as STR (that is, Async) within 6 GHz. For example, frequency band information and MOM information may be transmitted together.

When indicated for inter-band link

Ex) [5 GHz and 6 GHz, MOM=1]: A method for operating as a non-STR (that is, Sync) between 5 GHz and 6 GHz.

Figure 23:
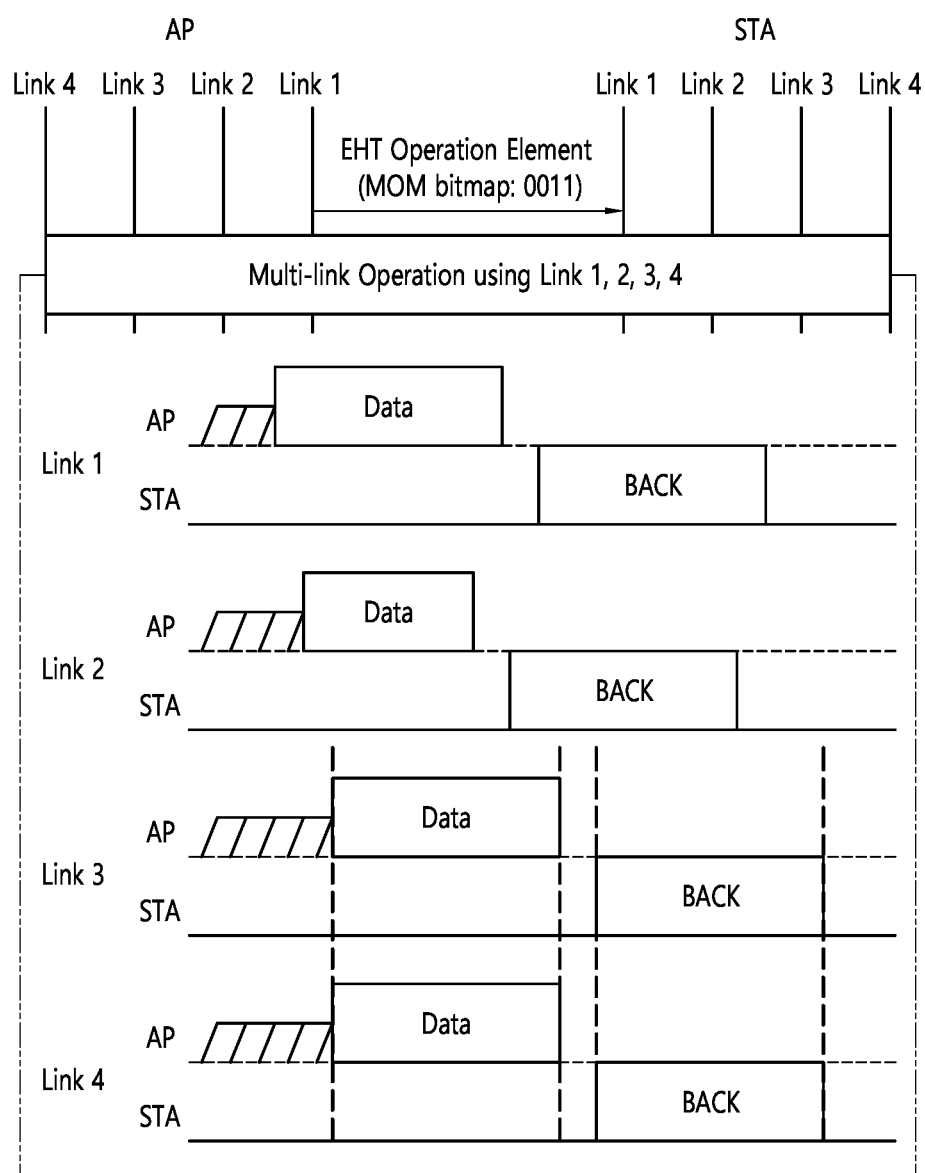
FIG. 23 is a diagram illustrating an embodiment of a method of switching a multi-link operation mode in option 2 in which the basic operation is not determined.

FIG. 23 is a diagram illustrating an embodiment of a method of switching a multi-link operation mode in option 2 in which the basic operation is not determined.

Referring to FIG. 23, the multi-link operation mode may be switched using the bitmap described in option 2 and the EHT Operation Element.

The AP may inform the STA of information related to the multi-link operation mode, informing that links 1 and 2 transmit frames as STR (that is, Async. Operation mode) and links 3 and 4 transmit frames as non-STR (that is, Sync Operation mode), in the form of a bitmap through the EHT Operation Element. The STA may obtain information related to the multi-link operation mode, and may transmit a frame to the AP according to the indicated information. For example, the STA may transmit a frame as an STR (or asynchronous operation mode) in links 1 and 2, and may transmit a frame as a non-STR (or Sync. operation mode) in links 3 and 4. For example, when the STA transmits a signal in a non-STR, the STA may transmit the frame by matching the start and end of the frame.

FIGS. 22 and 23 show an embodiment of an AP-only decision.

Hereinafter, an embodiment of a decision based on an operation mode negotiation between an AP and an STA will be described.

1) When AP Adjusts According to STA Mode Capability

1-A) when the AP Operates in a Unified Mode for the Link Based on the Capabilities of all STAs All STAs can operate in a unified multi-link operation mode through mode negotiation so that all STAs can operate.

Figure 24:
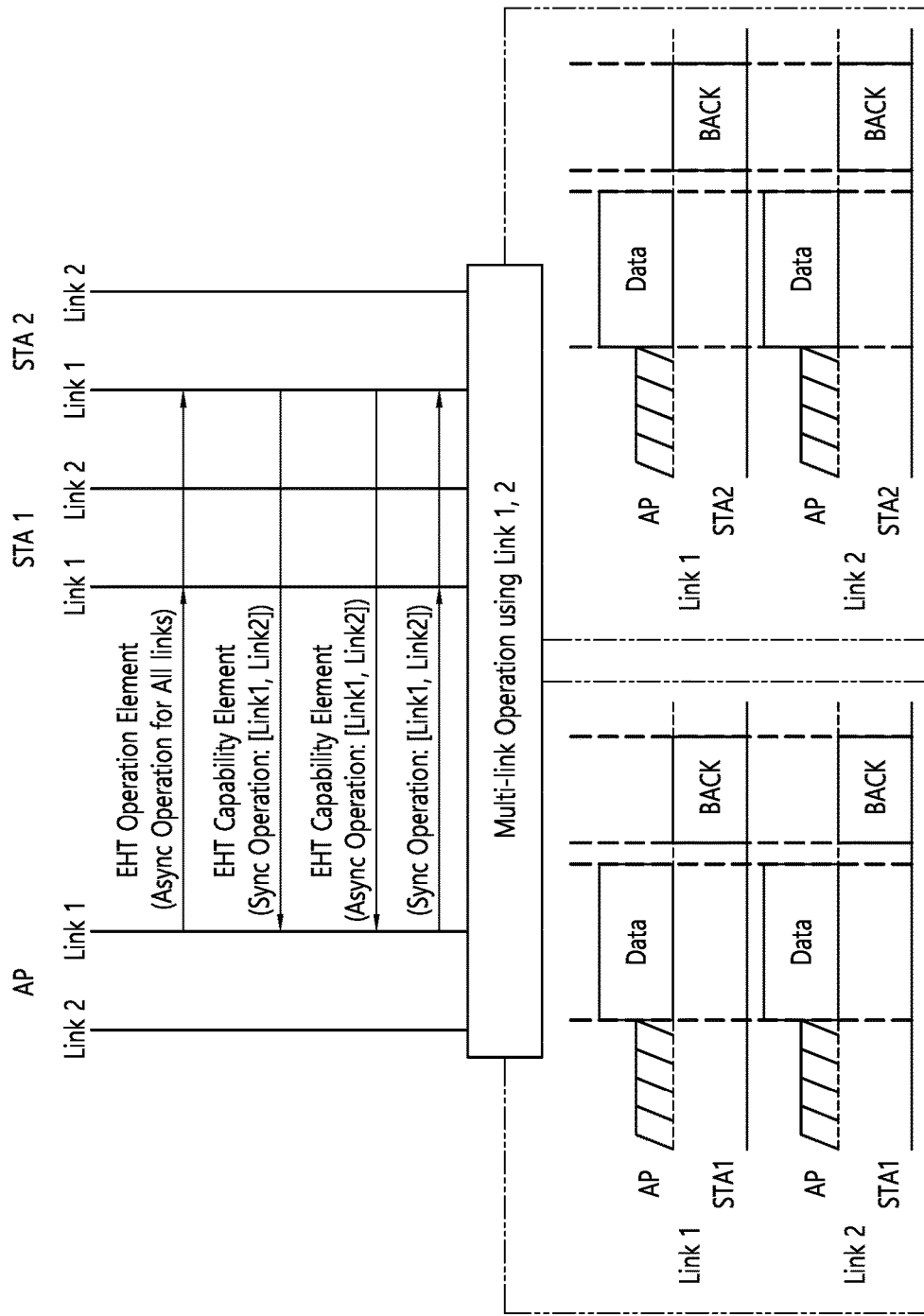
FIG. 24 is a diagram illustrating an embodiment of a method for determining a multi-link operation mode through negotiation between an STA and an AP.

FIG. 24 is a diagram illustrating an embodiment of a method for determining a multi-link operation mode through negotiation between an STA and an AP.

Referring to FIG. 24, the AP may inform the STAs (STA1, STA2) that Links 1 and 2 operate in Async. mode (that is, STR). For links 1 and 2, STA 1 may inform the AP that Async. (that is, STR) is possible, and STA 2 may inform the AP that Sync. (that is, non-STR) is possible. Therefore, the AP may configure Links 1 and 2 in a Sync mode (that is, non-STR) capable of operating both STAs. Finally, the AP may inform STAs 1 and 2 that Links 1 and 2 operate in Sync (that is, non-STR).

1-2) when the AP Operates Each STA in a Separate Mode

Each of the STAs may operate in an operation mode determined through mode negotiation.

Figure 25:
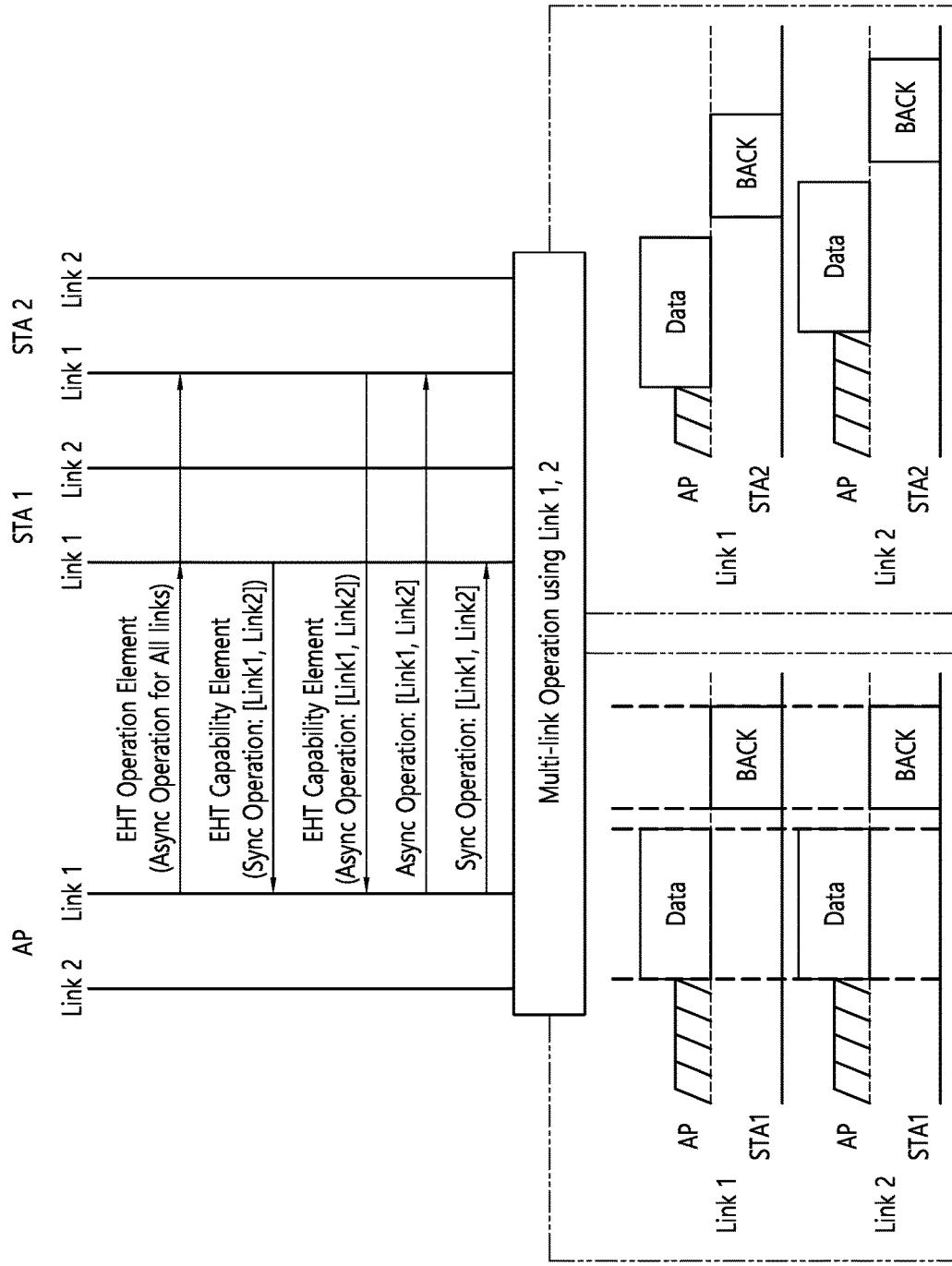
FIG. 25 is a diagram illustrating an embodiment of a method for determining a multi-link operation mode through negotiation between an STA and an AP.

FIG. 25 is a diagram illustrating an embodiment of a method for determining a multi-link operation mode through negotiation between an STA and an AP.

Referring to FIG. 25, the AP may inform the STAs (STA1 and STA2) that Links 1 and 2 operate in the Async mode (that is, STR). For links 1 and 2, STA 1 may inform the AP that Sync (that is, non-STR) is possible and STA 2 may inform the AP that Async (that is, STR) is possible. Accordingly, the AP may set Links 1 and 2 to Sync mode for STA 1 and may set Links 1 and 2 to Async mode for STA 2. Then, the AP may transmit the corresponding information to the STAs (STA1 and STA2).

Figure 26:
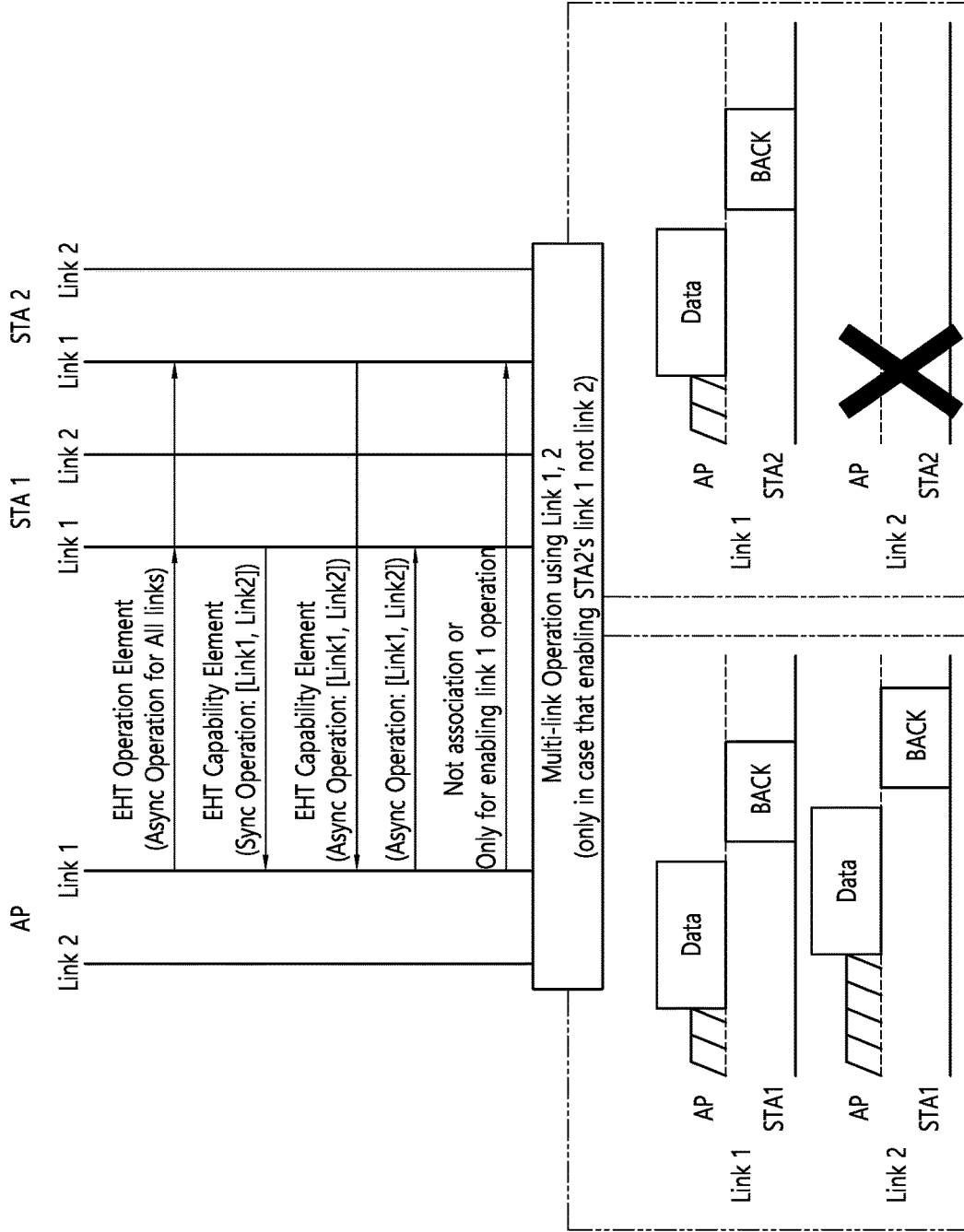
FIG. 26 is a diagram illustrating an embodiment of a method for determining a multi-link operation mode through negotiation between an STA and an AP.

2) When the AP Checks the STA Mode Capability, and does not Perform Association with the STA, or Performs Negotiation Only for Some Links FIG. 26 is a diagram illustrating an embodiment of a method for determining a multi-link operation mode through negotiation between an STA and an AP.

The AP may inform the STA that Links 1 and 2 operate in Async mode (or STR). For links 1 and 2, STA 1 may inform the AP that Async (or STR) is possible and STA 2 may inform the AP that Sync (or non-STR) is possible. The AP may enable only Link 1 (or Link 2) to operate with respect to STA 2 in order to operate with Async (or STR), or may not establish an association with STA 2. The AP may inform STA 1 that it operates with an Async operation (or STR).

2. Control Frame

An STA (AP or non-AP STA) may switch a multi-link operation mode using a control frame. In particular, this method can switch modes more flexibly compared to the link setup step.

For example, if the STA transmits a control frame in synchronization (that is, using Sync. Operation or non-STR) with the link between the links in a situation where the STA is operating in Async (or STR), during the TXOP or longer duration related to the control frame, the STA may transmit the frame in the Sync Operation mode (or non-STR) in the corresponding link. Information included in this control frame may include information described in a control field to be described later.

The control frame may have the following options depending on the type.

Option 1) Transmission without immediate response: A method for switching the multi-link operation mode by transmitting a control frame (CF) without a response.

Ex) A method for using an existing frame such as CTS-to-Self by modifying it or using a new multi-link operation frame.

Figure 27:
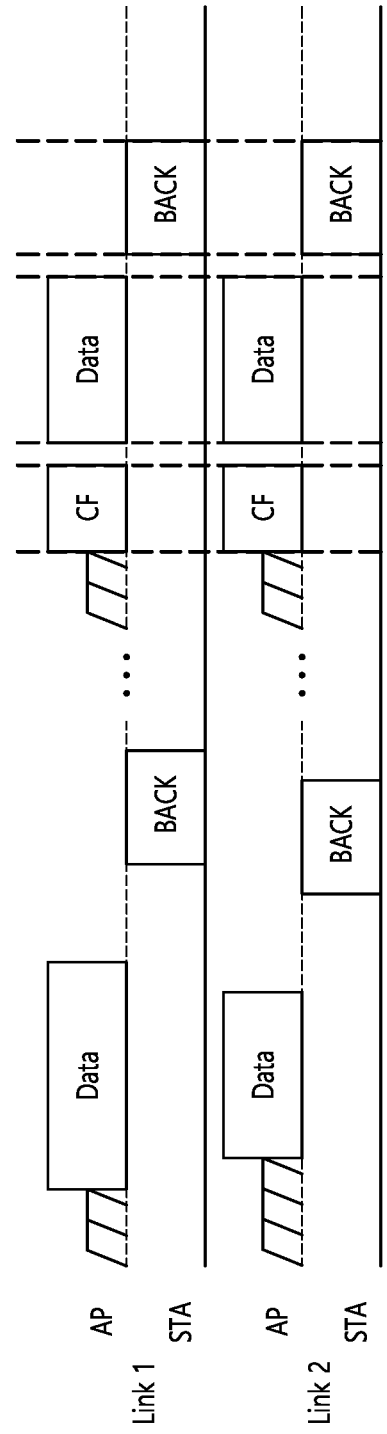
FIG. 27 is a diagram illustrating an embodiment of a method for switching a multi-link operation mode using a control frame.

An exemplary procedure for switching from Async to Sync in Option 1 is shown in FIG. 27.

FIG. 27 is a diagram illustrating an embodiment of a method for switching a multi-link operation mode using a control frame.

Referring to FIG. 27, when the AP and the STA are operating as STR (or Async. Operation mode), the AP may aggregate multi-links by synchronizing between links and transmit a control frame (CF) for multi-link operation mode conversion to the STA. After the STA receives the control frame through the multi-link (that is, Link 1 and Link 2), the AP and the STA may operate in a non-STR (or Sync. Operation mode). The duration of operation in a non-STR (or Sync. Operation mode) may be a TXOP related to a control frame or more.

Option 2) Transmission with immediate response: Switching the Multi-link Operation mode by transmitting a control frame that requires a response.

Ex) A method for using an existing frame such as RTS-CTS by modifying it or using a new operation multi-link mode frame.

Figure 28:
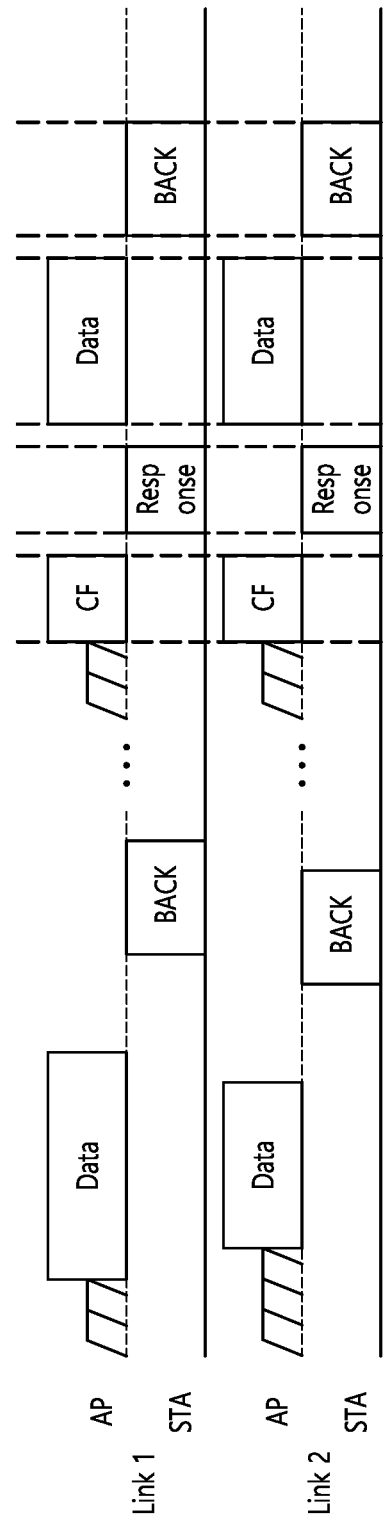
FIG. 28 is a diagram illustrating an embodiment of a method for switching a multi-link operation mode using a control frame.

An exemplary procedure for switching from Async to Sync in Option 2 is shown in FIG. 28.

FIG. 28 is a diagram illustrating an embodiment of a method for switching a multi-link operation mode using a control frame.

Referring to FIG. 28, when the AP and the STA are operating as STRs (or Async. Operation mode), the AP may aggregate multi-links by synchronizing between links and transmit a control frame (CF) for multi-link operation mode conversion to the STA. The STA that has received a control frame through the multi-link (that is, Links 1 and 2) may transmit a response frame to the control frame to the AP through the multi-link (that is, Links 1 and 2). After the AP receives a response frame through the multi-link, the AP and the STA may operate in a non-STR (or Sync. Operation mode). The duration of operation in a non-STR (or Sync. Operation mode) may be TXOP related to a control frame and the response frame or more.

3. Control Field

A multi-link operation mode for each link may be switched using a control field, where the control field may be referred to as a multi-link operation mode (MOM) control field. This MOM Control field may be included in the element of the control frame, data frame, or management frame described above. Information that may be included in the MOM Control field is as follows, but is not limited thereto.

Multi-link Operation Mode (MOM): Determines the multi-link operation mode to be switched Ex) If MOM=1, switch to non-STR (that is, Sync mode), otherwise switch to STR (that is, Async mode)

Link information (Link identifier): An identifier that can distinguish each link. For example, the STA may newly define an identifier for each link. For example, the STA may define a link identifier using an existing BSSID, BSS Color, etc. For example, the STA may define the identifier based on channel information for the link.

Ex 1) New Link ID: 0, 1, etc.

Ex 2) Channel information: A method of defining a link identifier based on channel information uses channel indication information used in HT/VHT/HE Operation element, or link channel information can be expressed as a primary channel number, center frequency, channel width, and the like newly defined in EHT.

Information Considerations

Link information may not be necessary, if it is applied to all links during mode conversion.

Ex) [MOM=1]: Switch to non-STR (that is, Sync operation mode).

Mode switching can also be indicated in the form of a tuple of MOM and Link information.

Ex) [MOM=1, Link ID=1]: Convert Link 1 to non-STR

In addition, when multiple links are applied to one MOM, one or more link information may be combined in one MOM.

Ex) [MOM=0, Link ID=1,2]: Convert Link 1, 2 to STR.

If there is a link order, it may be indicated in the form of a MOM bitmap without link information.

Ex) MOM bitmap: 0011: 1st link and 2nd link operate in STR (that is, Async mode), 3rd link and 4th link operate in non-STR (that is, Sync mode).

Figure 29:
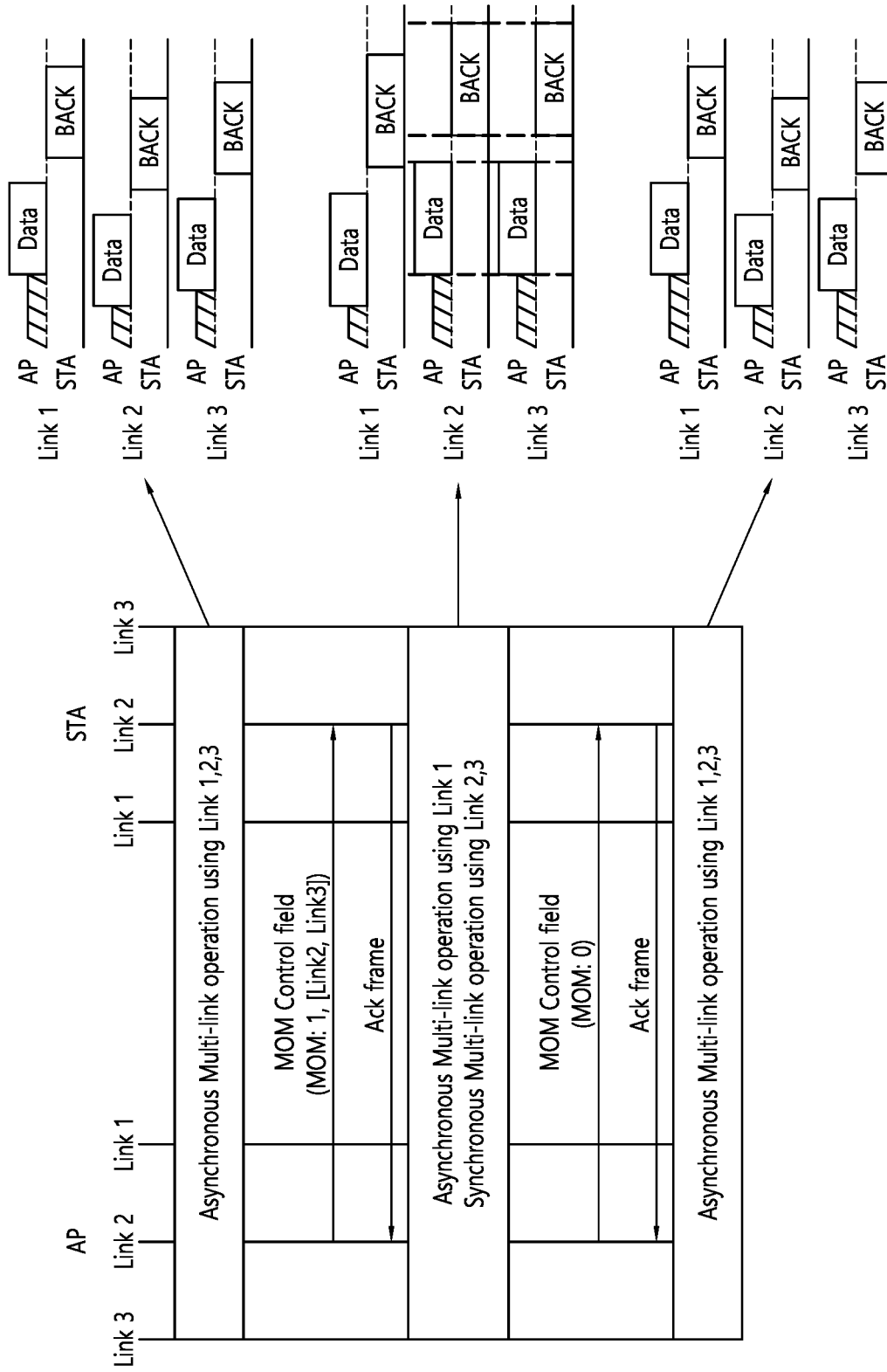
FIG. 29 is a diagram illustrating an embodiment of a method for switching a multi-link operation mode using a control field.

An exemplary procedure according to the information specified for the above control field is shown in FIG. 29.

FIG. 29 is a diagram illustrating an embodiment of a method for switching a multi-link operation mode using a control field.

Referring to FIG. 29, the AP and the STA may be operating in STR (that is, Async. Operation mode) in all links. The AP may transmit, to the STA by using the MOM Control field, information that Link 2 and Link 3 should be switched to and operate in non-STR (that is, Sync. Operation mode). The STA may transmit a response frame (for example, an ACK frame) to the AP. The AP and the STA may transmit a frame in a non-STR (that is, Sync. Operation mode) in Links 2 and 3 and may transmit a frame in an STR (that is, Async. Operation mode) in Link 1. The AP may convert a link (for example, link 2 or link 3) operating in a non-STR (that is, Sync mode) to an STR (that is, Async. Operation mode) by using the MOM control field (for example, MOM=0).

Figure 30:
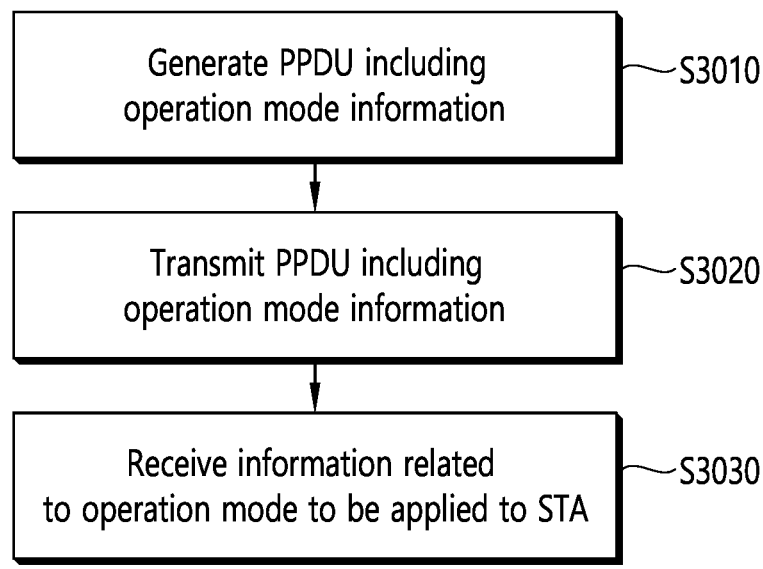
FIG. 30 is a diagram illustrating an embodiment of an STA operation.

FIG. 30 is a diagram illustrating an embodiment of an STA operation.

Referring to FIG. 30, the STA may generate a PPDU including operation mode information (S3010). For example, the STA may transmit operation mode information related to whether it can operate as simultaneous transmit and receive (STR). That is, the STA may generate and transmit a PPDU including operation mode information related to whether signal transmission and signal reception can be simultaneously performed. For example, the STA may transmit information related to whether it can operate as an STR or whether it can operate as a non-STR. When the STA operates as an STR, each link may perform transmission/reception independently, and when operating as a non-STR, each link may perform transmission/reception in synchronization with each other. For example, each link may operate in different multi-link operation modes (STR, non-STR).

A method of transmitting information related to a multi-link operation mode may be divided into three cases as follows, and each case may be performed in conjunction or may be performed separately.

A. Link Setup: A multi-link operation mode for each link can be set in the step of providing link information or the step of performing negotiation of capability.

B. Control frame: A multi-link operation mode can be switched using a control frame.

C. Control field: A multi-link operation mode may be switched using a control field.

1. Link Setup

A multi-link operation mode for each link may be determined in a link setup step. Information related to the multi-link operation mode may be transmitted/received in the link setup step. For example, the information related to the multi-link operation mode may be included in an EHT Capability/Operation element or a new multi-link (Multi-link) related element. For example, an element including information related to a multi-link operation mode may be included in a Beacon, Probe Request/Response, (Re)Association Request/Response, etc.

Information that could be included in a signal (for example, Beacon, Probe Request/Response, (Re)Association Request/Response, etc.) including information related to the multi-link operation mode is as follows, but is not limited thereto.

The AP and the STA may basically have the following multi-link (ML) capability information.

Number of Supported Links (NSL): The total number of links that the STA can support for multi-link operation (for example, the number of RF/antennas).

Link identifier (or Link information): An identifier that can distinguish each link. For example, the STA may newly define an identifier for each link. For example, the STA may define a link identifier using an existing BSSID, BSS Color, etc. For example, the STA may define the identifier based on channel information for the link.

Ex 1) New Link ID: 0, 1, etc.

Ex 2) Channel information: A method of defining a link identifier based on channel information uses channel indication information used in HT/VHT/HE Operation element, or may be newly defined in the EHT so that link channel information may be expressed as a primary channel number, a center frequency, a channel width, etc.

Supported Band Information (SBI): Information about a band capable of multi-link operation, such as, an ID capable of distinguishing a band in which EHT operates, a Band ID field of the existing spec, etc. However, it is not limited thereto.

Ex 1) Band ID: 0-2.4 GHz, 1-5 GHz, 2-6 GHz, etc.

Ex 2) Band ID field: 2-2.4 GHz, 4-5 GHz, 7-6 GHz, etc.

Number of Supported Links per Band (NSLpB): The number of links that can support multi-link per band Ex 1) 1, 2, 3, etc.

Supported Bandwidth (SB) (per band): Bandwidth that can be supported. This bandwidth information may be indicated as a supportable bandwidth for each frequency band.

Ex 1) In case of indication regardless of the frequency band (for example, the maximum bandwidth supported in all bands): 80/160/320 MHz, etc.

Ex 2) In case of indication per frequency band: 160 MHz in 5 GHz band, 160 MHz in 6 GHz band, etc.

Supported number of Spatial Stream (NSS): Number of Spatial Streams supported by each link Ex) 1/2/4/8/16

Link Status: Information on whether each link is currently available for data transmission (On/Off). Link Status may include not only information related to the capability that can be used for data transmission, but also information related to whether or not to use the link for data transmission even if the link has the capability for data transmission.

Ex) In the case of indicating by link-specific information, for example, it can be indicated as follows.

0: The STA cannot currently use the link for data transmission.

1: The STA can currently use the link for data transmission.

Ex) When not indicated by information for each link, it can be expressed in the form of a bitmap. For example, in the case of 011, the first link may include information that there is the capability for data transmission, but is not currently used for data transmission.

Preferred links or bands: A frequency band or link preferred by the STA may be indicated. The preferred link may be determined based on the BSS information of the AP or may be determined by the STA itself.

Ex) 1: Prefer the Link or Band

In some cases, all of the above contents may be included, or only some of the above contents may be included. For example, if each link is classified only by a band, a link identifier may not be needed. For example, if the order/location indicating the band information is determined, the Supported band information field may not be included. For example, since a single Supported link may support multiple bands instead of one band, the sum of the Number of Supported Links per band for all bands may not equal the Number of Supported Links. In this case, both Number of Supported Links per band and Number of Supported Link may exist. For example, if implementing/defining that one link can support only one band in order to reduce complexity, the total number of Number of Supported Links and Number of Supported Links per band will be the same, in this case, the Number of Supported links field may not be included. For example, in the case of Link Status, if the AP/STA includes only information related to a link capable of data transmission in the capability information, Link Status information may not be included. For example, preferred links or bands may be included in elements other than capabilities. (Preferred links or bands may not be included if no preference is required).

Information on the operation mode is as follows.

Multi-link Operation Mode (MOM): Information related to a synchronous operation mode (that is, non-STR) or an asynchronous operation mode (that is, STR). For example, information related to whether the STA operates as a non-STR or an STR may be included.

Ex) If MOM=1, it operates in synchronous operation mode (that is, non-STR), otherwise it operates in asynchronous operation mode (that is, STR).

For example, the information related to the operation mode may be capability information of the STA. For example, the information related to the operation mode may be information related to the operation mode in which the STA will operate. For example, the STA may transmit information related to an operation mode supported by the STA, and the AP may transmit information related to an operation mode in which the STA will actually operate.

The meaning that the STA supports the asynchronous operation mode (that is, STR) may be interpreted as being able to sufficiently support the synchronous operation mode (that is, non-STR). That is, the asynchronous operation mode (that is, STR) may include a synchronous operation mode (that is, non-STR).

The above information may have several options depending on the presence or absence of a default operation in the multi-link. For example, if the asynchronous operation mode (that is, STR) is a mandatory or baseline multi-link operation, information about the synchronous operation mode (that is, non-STR) may be included.

Dynamic Operation Mode (DOM): Information related to whether a link operating in an asynchronous operation mode (that is, STR) can be dynamically switched to a synchronous operation mode (that is, non-STR).

For example, the DOM may be information independent of the MOM.

Ex) If DOM=1, dynamic mode can be switched to STR->non-STR->STR, etc.

1) Option 1: When Default Operation is Determined. For Example, when the Default Operation is Determined to be STR (or Asynchronous Operation Mode) or Non-STR (or Synchronous Operation Mode)

A link for an operation other than the default operation may be indicated through the link information. For example, when the basic operation is STR, the STA may transmit information related to a link operating in a non-STR.

Ex) Sync Operation Link: 1, 2 (Default: Async)

MOM and link information may exist as a tuple, but it is not necessarily indicated because the MOM may be indicated implicitly.

For example, if the Default Operation is STR (or asynchronous operation mode) and there are multiple link pairs operating as non-STR (or synchronous operation mode), that is, if there are multiple link pairs that need to be transmitted in synchronization, additional information (for example, Sync Operation number) to distinguish them may be required.

Ex) Sync Operation number=0+Link ID=1, 2: Links 1 and 2 operate as STR

Ex) Sync Operation number=1+Link ID=4, 5: Links 4 and 5 operate as non-STR

The multi-link operation mode can be switched using the EHT Operation Element and Link information.

For example, STR (or Async. Operation) may be a Default Operation. Accordingly, the AP may inform the STA of link information for transmitting a frame in a non-STR (that is, Sync. Operation mode) through the EHT Operation Element. Therefore, non-STR (that is, Sync. Operation) is applied to links 2 and 3, and in link 2 and link 3 in communication between the AP and the STA, a frame is transmitted by synchronizing. That is, link 2 and link 3 may operate in a non-STR mode in which simultaneous transmission and reception are not performed.

2) Option 2: When Default Operation is not Determined

The method for indicating of option 2 can also be utilized in option 1.

Indications for all links, that is, how to set the mode (that is, STR or non-STR) for all links.

Ex) When MOM=1, all links operate as non-STR (that is Sync), otherwise operate as STR (that is, Async).

A method for indicating MOM and Link information in the form of a tuple.

Ex) [MOM=1, Link ID=1]

For example, when one MOM is applied to several links, one or more link information may be combined in one MOM.

Ex) [MOM=0, Link ID=1,2]

If there is a link order, information related to the multi-link operation mode for each link may be transmitted in the form of a MOM bitmap without link information.

Ex) [MOM bitmap: 0011]: 1st link and 2nd link operate as STR (that is, Async), and 3rd link and 4th link operate as non-STR (that is, Sync).

When it is indicated for a link by frequency band

Ex 1) When the band order is determined (2.4 GHz-5 GHz-6 GHz), [MOM=010]: Operates as a non-STR (that is, Sync) within 5 GHz, and operates as an STR (that is, Async) within 2.4 GHz and 6 GHz.

Ex 2) When the band order is not determined [5 GHz+MOM=1, 6 GHz+MOM=0]: A method of operating as a non-STR (that is, Sync) within 5 GHz and as an STR (that is, Async) within 6 GHz. For example, frequency band information and MOM information may be transmitted together.

When indicated for inter-band link

Ex) [5 GHz and 6 GHz, MOM=1]: A method that operates as a non-STR (that is, Sync) between 5 GHz and 6 GHz.

The STA may transmit a PPDU including operation mode information (S3020).

The STA may receive information related to an operation mode to be applied to the STA (S3030). For example, the AP may determine the operation mode in which the STA will operate based on the operation mode information (for example, multi-link operation mode capability information of STA) transmitted by the STA, and may transmit the determined operation mode information to the STA. Links related to one STA may operate in different multi-link operation modes (STR, non-STR).

A method for setting the multi-link operation mode may be based on FIGS. 21 to 29. The method for setting the multi-link operation mode has effect of setting an optimal operation mode for each link of the STA.

Figure 31:
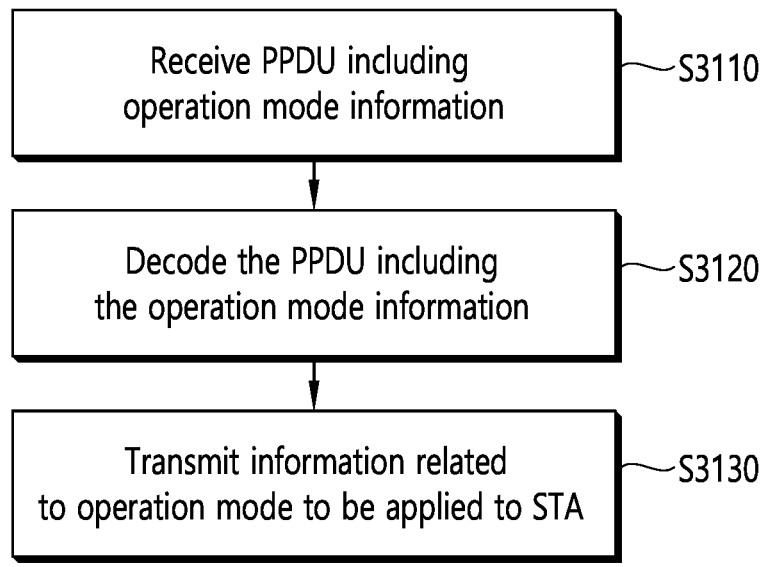
FIG. 31 is a diagram illustrating an embodiment of an AP operation.

FIG. 31 is a diagram illustrating an embodiment of an AP operation.

Referring to FIG. 31, the AP may receive a PPDU including operation mode information (S3110). The AP may decode the PPDU including the operation mode information (S3120). For example, the AP may receive operation mode information related to whether it can operate as a simultaneous transmit and receive (STR). That is, the AP may generate and transmit a PPDU including operation mode information related to whether signal transmission and signal reception can be simultaneously performed. For example, the AP may receive information related to whether it can operate as an STR or whether it can operate as a non-STR. When the STA operates as an STR, each link may perform transmission/reception independently, and when operating as a non-STR, each link may perform transmission/reception in synchronization with each other. For example, each link may operate in different multi-link operation modes (STR, non-STR).

The AP may receive, from the STA, information related to whether the STA can operate as an STR or a non-STR, and determine in which mode the STA will operate based on the received information. The multi-link operation mode (for example, STR or non-STR mode) may be set differently for each link. The multi-link operation mode can be dynamically changed.

The AP may transmit information related to an operation mode to be applied to the STA (S3130).

A method of transmitting information related to a multi-link operation mode may be divided into three cases as follows, and each case may be performed in conjunction or may be performed separately.

A. Link Setup: A multi-link operation mode for each link can be set in the step of providing link information or in the step of performing negotiation of capability.

B. Control frame: A multi-link operation mode can be switched using a control frame.

C. Control field: A multi-link operation mode may be switched using a control field.

1. Link Setup

A multi-link operation mode for each link may be determined in a link setup step. Information related to the multi-link operation mode may be transmitted/received in the link setup step. For example, the information related to the multi-link operation mode may be included in an EHT Capability/Operation element or a new multi-link related element. For example, an element including information related to a multi-link operation mode may be included in a Beacon, Probe Request/Response, (Re)Association Request/Response, etc.

Information that may be included in a signal (for example, Beacon, Probe Request/Response, (Re)Association Request/Response, etc.) including information related to the multi-link operation mode is as follows, but is not limited thereto.

The AP and the STA may basically have the following multi-link (ML) capability information.

Number of Supported Links (NSL): The total number of links that the STA can support for multi-link operation (for example, the number of RF/antennas).

Link identifier (or Link information): An identifier that can distinguish each link. For example, the STA may newly define an identifier for each link. For example, the STA may define a link identifier using an existing BSSID, BSS Color, etc. For example, the STA may define an identifier based on channel information for a link.

Ex 1) New Link ID: 0, 1, etc.

Ex 2) Channel information: A method for defining a link identifier based on channel information may use channel indication information used in HT/VHT/HE Operation element, or link channel information can be expressed as a newly defined in EHT, Primary channel number, Center Frequency, Channel Width, and the like.

Supported Band Information (SBI): There may be information on a band capable of multi-link operation, specifically an ID that can distinguish a band in which EHT operates, a Band ID field of the existing spec, etc., but may not be limited thereto.

Ex 1) Band ID: 0-2.4 GHz, 1-5 GHz, 2-6 GHz, etc.

Ex 2) Band ID field: 2-2.4 GHz, 4-5 GHz, 7-6 GHz, etc.

Number of Supported Links per Band (NSLpB): The number of links that can support multi-link per band Ex 1) 1, 2, 3, etc.

Supported Bandwidth (SB) (per band): Bandwidth that can be supported. This bandwidth information may be indicated as a supportable bandwidth for each frequency band.

Ex 1) In case of indicating regardless of the frequency band (for example, the maximum bandwidth supported in all bands): 80/160/320 MHz, etc.

Ex 2) In case of indicating per frequency band: 160 MHz in 5 GHz band, 160 MHz in 6 GHz band, etc.

Supported number of Spatial Stream (NSS): Number of Spatial Streams supported by each link Ex) 1/2/4/8/16

Link Status: Information (On/Off) on whether each link can be used for current data transmission. Link Status may include not only information related to the capability that can be used for data transmission, but also information related to whether or not to use the link for data transmission even if the link has the capability for data transmission.

Ex) In the case of indicating by link-specific information, for example, it can be indicated as follows.

0: The STA cannot currently use the link for data transmission.

1: The STA can currently use the link for data transmission.

Ex) When not indicated by information for each link, it may be expressed in the form of a bitmap. For example, in the case of 011, it may include information that the first link has capability for data transmission, but is not currently used for data transmission.

Preferred links or bands: A frequency band or link preferred by the STA may be indicated. The preferred link may be determined based on the BSS information of the AP or may be determined by the STA itself.

Ex) 1: Prefer the link or band

In some cases, all of the above contents may be included, or only some of the above contents may be included. For example, if each link is classified only by a band, a link identifier may not be needed. For example, if the order/location indicating the band information is determined, the supported band information field may not be included. For example, since a single supported link may support multiple bands instead of one band, the sum of the number of supported links per band for all bands may not equal the number of supported links. In this case, both number of supported links per band and number of supported link may exist. For example, if implementing/defining that one link supports only one band in order to reduce complexity, the total number of supported links and number of supported links per band will be the same, in this case, the number of supported links field may not be included. For example, in the case of Link Status, if the AP/STA includes only information related to a link capable of data transmission in the capability information, Link Status information may not be included. For example, preferred links or bands may be included in elements other than capabilities. (Preferred links or bands may not be included if no preference is required).

Information on the operation mode is as follows.

Multi-link Operation Mode (MOM): Information related to a synchronous operation mode (that is, non-STR) or an asynchronous operation mode (that is, STR). For example, information related to whether the STA operates as a non-STR or an STR may be included.

Ex) If MOM=1, it operates in synchronous operation mode (that is, non-STR), otherwise it operates in asynchronous operation mode (that is, STR).

For example, the information related to the operation mode may be capability information of the STA. For example, the information related to the operation mode may be information related to the operation mode in which the STA will operate. For example, the STA may transmit information related to an operation mode supported by the STA, and the AP may transmit information related to an operation mode in which the STA will actually operate.

The meaning that the STA supports the asynchronous operation mode (that is, STR) may be interpreted as being able to sufficiently support the synchronous operation mode (that is, non-STR). That is, the asynchronous operation mode (that is, STR) may include a synchronous operation mode (that is, non-STR).

The above information may have several options depending on the presence or absence of a default operation in the multi-link. For example, if the asynchronous operation mode (that is, STR) is a mandatory or baseline multi-link operation, information about the synchronous operation mode (that is, non-STR) may be included.

Dynamic Operation Mode (DOM): Information related to whether a link operating in an asynchronous operation mode (that is, STR) can be dynamically switched to a synchronous operation mode (that is, non-STR).

For example, the DOM may be information independent of the MOM.

Ex) If DOM=1, dynamic mode can be switched to STR->non-STR->STR, etc.

1) Option 1: When Default Operation is Determined. For Example, when the Default Operation is Determined to be STR (or Asynchronous Operation Mode) or Non-STR (or Synchronous Operation Mode)

A link for an operation other than the default operation may be indicated through the link information. For example, when the basic operation is STR, the STA may transmit information related to a link operating in a non-STR.

Ex) Sync Operation Link: 1, 2 (Default: Async)

MOM and link information may exist as a tuple, but it is not necessarily indicated because the MOM may be indicated implicitly.

For example, if the Default Operation is STR (or asynchronous operation mode) and there are multiple link pairs operating as non-STR (or synchronous operation mode), that is, if there are multiple link pairs that need to be transmitted in synchronization, additional information (for example, Sync Operation number) to distinguish them may be required.

Ex) Sync Operation number=0+Link ID=1, 2: Links 1 and 2 operate as STR

Ex) Sync Operation number=1+Link ID=4, 5: Links 4 and 5 operate as non-STR

The multi-link operation mode can be switched using the EHT Operation Element and Link information.

For example, STR (or Async. Operation) may be a Default Operation. Accordingly, the AP may inform the STA of link information for transmitting a frame in a non-STR (that is, Sync. Operation mode) through the EHT Operation Element. Therefore, non-STR (that is, Sync. Operation) is applied to links 2 and 3, and in link 2 and link 3 in communication between the AP and the STA, a frame is transmitted by synchronizing. That is, link 2 and link 3 may operate in a non-STR mode in which simultaneous transmission and reception are not performed.

2) Option 2: When Default Operation is not Determined

The method for indicating of option 2 can also be utilized in option 1.

Indicating for all links, that is how to set the mode (that is, STR or non-STR) for all links.

Ex) When MOM=1, all links operate as non-STR (that is, Sync), otherwise operate as STR (that is, Async).

A method for indicating MOM and Link information in the form of a tuple.

Ex) [MOM=1, Link ID=1]

For example, when one MOM is applied to several links, one or more link information may be combined in one MOM.

Ex) [MOM=0, Link ID=1,2]

If there is a link order, information related to the multi-link operation mode for each link may be transmitted in the form of a MOM bitmap without link information.

Ex) [MOM bitmap: 0011]: 1st link and 2nd link operate as STR (that is, Async), and 3rd link and 4th link operate as non-STR (that is, Sync).

When it is indicated for a link by frequency band

Ex 1) When the band order is determined (2.4 GHz-5 GHz-6 GHz), [MOM=010]: Operates as a non-STR (that is, Sync) within 5 GHz, and operates as an STR (that is, Async) within 2.4 GHz and 6 GHz.

Ex 2) When the band order is not determined [5 GHz+MOM=1, 6 GHz+MOM=0]: Operates as a non-STR (that is, Sync) within 5 GHz, and operates as a STR (that is, Async) within 6 GHz How to. For example, frequency band information and MOM information may be transmitted together.

When indicated for inter-band link

Ex) [5 GHz and 6 GHz, MOM=1]: A method for operating as a non-STR (that is, Sync) between 5 GHz and 6 GHz.

For example, the AP may determine the operation mode in which the STA will operate based on the operation mode information (for example, multi-link operation mode capability information of STA) transmitted by the STA, and may transmit the determined operation mode information to the STA. Links related to one STA may operate in different multi-link operation modes (STR, non-STR).

A method of setting the multi-link operation mode may be based on FIGS. 21 to 29. The method for setting the multi-link operation mode has the effect of setting an optimal operation mode for each link of the STA.

Some of the detailed steps shown in the example of FIGS. 30 and 31 may not be essential steps and may be omitted. In addition to the steps shown in FIGS. 30 and 31, other steps may be added, and the order of the steps may vary. Some of the above steps may have their own technical meaning.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, may be implemented based on the processors 111 and 121 and the memories 112 and 122 of FIG. 1, or, may be implemented based on the processor 610 and the memory 620 of FIG. 19. For example, an apparatus herein may include a memory and a processor operatively coupled to the memory, wherein the processor includes operation mode information related to whether the processor is capable of simultaneously transmitting and receiving signals. It may be configured to generate a PPDU to be used and transmit the PPDU.

The technical features of the present specification may be implemented based on a computer readable medium (CRM). For example, the CRM proposed by the present specification may include instructions, based on being executed by at least one processor of a station (STA) supporting multi-links in a wireless local area network (WLAN) system. At least one computer readable medium may store instructions for performing operations including generating a PPDU including operation mode information related to whether signal transmission and signal reception can be simultaneously performed, and transmitting the PPDU.

The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network.

Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
generating, by an Access Point station (AP STA) affiliated with an Access Point Multi-Link Device (AP MLD), a Multi-Link element including a control bit related to a type of the AP MLD,
wherein the control bit is set to one (1) based on links of the AP MLD, the links being part of a Non-Simultaneous Transmit and Receive (NSTR) link pair,
wherein the control bit is set to zero (0) based on links of the AP MLD, all pairs of the links being Simultaneous Transmit and Receive (STR) link pairs; and
transmitting, by the AP STA, the Multi-Link element.

2. The method of claim 1, wherein the NSTR link pair is related to links on which signal transmission and signal reception cannot be simultaneous.

3. The method of claim 1, wherein the STR link pairs are related to links on which signal transmission and signal reception can be simultaneous.

4. The method of claim 1, wherein all links of the AP MLD are part of the NSTR link pair when the control bit is set to one (1).

5. The method of claim 1, wherein all links of the AP MLD are part of the STR link pairs when the control bit is set to zero (0).

6. The method of claim 1, wherein the Multi-Link element further includes a link identifier (ID) of a first link and link information, wherein the Multi-link element is transmitted in the first link, wherein the link information indicates whether a second link and the first link are part of a NSTR link pair.

7. A method in a wireless local area network (WLAN) system, the method comprising:
receiving, by a non-Access Point station (non-AP STA) affiliated with a non-AP Multi-Link Device (non-AP MLD), a Multi-Link element from an Access Point Multi-Link Device (AP MLD), the Multi-Link element including a control bit related to a type of the AP MLD,
wherein the control bit is set to one (1) based on links of the AP MLD, the links being part of a Non-Simultaneous Transmit and Receive (NSTR) link pair,
wherein the control bit is set to zero (0) based on links of the AP MLD, all pairs of the links being Simultaneous Transmit and Receive (STR) link pairs; and
decoding, by the non-AP STA, the Multi-Link element.

8. The method of claim 7, wherein the NSTR link pair is related to links on which signal transmission and signal reception cannot be simultaneous.

9. The method of claim 7, wherein the STR link pairs are related to links on which signal transmission and signal reception can be simultaneous.

10. The method of claim 7, wherein all links of the AP MLD are part of the NSTR link pair when the control bit is set to one (1).

11. The method of claim 7, wherein all links of the AP MLD are part of the STR link pairs when the control bit is set to zero (0).

12. The method of claim 7, wherein the Multi-Link element further includes a link identifier (ID) of a first link and link information, wherein the Multi-link element is received in the first link, wherein the link information indicates whether a second link and the first link are part of a NSTR link pair.

13. A non-Access Point station (non-AP STA) affiliated with a non-AP Multi-Link Device (non-AP MLD) in a wireless local area network (WLAN) system, comprising:
a transceiver adapted to transmit and/or receive a wireless signal; and a processor coupled to the transceiver,
wherein the processor is adapted to:
receive, via the transceiver, a Multi-Link element from an Access Point Multi-Link Device (AP MLD), the Multi-Link element including a control bit related to a type of the AP MLD,
wherein the control bit is set to one (1) based on links of the AP MLD, the links being part of a Non-Simultaneous Transmit and Receive (NSTR) link pair,
wherein the control bit is set to zero (0) based on links of the AP MLD, all pairs of the links being Simultaneous Transmit and Receive (STR) link pairs; and
decode the Multi-Link element.

14. The method of claim 13, wherein the NSTR link pair is related to links on which signal transmission and signal reception cannot be simultaneous.

15. The method of claim 13, wherein the STR link pairs are related to links on which signal transmission and signal reception can be simultaneous.

16. The method of claim 13, wherein all links of the AP MLD are part of the NSTR link pair when the control bit is set to one (1).

17. The method of claim 13, wherein all links of the AP MLD are part of the STR link pairs when the control bit is set to zero (0).

18. The method of claim 13, wherein the Multi-Link element further includes a link identifier (ID) of a first link and link information, wherein the Multi-link element is received in the first link, wherein the link information indicates whether a second link and the first link are part of a NSTR link pair.

* * * * *